(12) United States Patent
Germann et al.

(10) Patent No.: US 10,662,992 B2
(45) Date of Patent: *May 26, 2020

(54) BONDING OBJECTS TOGETHER

(71) Applicant: Woodwelding AG, Stansstad (CH)

(72) Inventors: Jonas Germann, Gümligen (CH); Jörg Mayer, Niederlenz (CH); Joakim Kvist, Nidau (CH); Patricia Poschner, Uettligen (CH)

(73) Assignee: WOODWELDING AG, Stansstad (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,871

(22) Filed: Jul. 22, 2019

(65) Prior Publication Data

US 2019/0338797 A1   Nov. 7, 2019

Related U.S. Application Data

(62) Division of application No. 15/112,019, filed as application No. PCT/CH2015/000010 on Feb. 3, 2015, now Pat. No. 10,385,899.

(30) Foreign Application Priority Data

Feb. 4, 2014   (CH) .......................... 145/14

(51) Int. Cl.
*B32B 37/00* (2006.01)
*F16B 17/00* (2006.01)
(Continued)

(52) U.S. Cl.
CPC ............. *F16B 17/00* (2013.01); *B21J 15/147* (2013.01); *B29C 65/08* (2013.01); *B29C 65/601* (2013.01);
(Continued)

(58) Field of Classification Search
CPC ... B29C 65/601; B29C 65/08; B29C 66/0242; B29C 66/721; F16B 17/00; F16B 5/04; F16B 11/006; B21J 15/147
(Continued)

(56) References Cited

U.S. PATENT DOCUMENTS

| 3,499,808 A | 3/1970 | Obeda |
| 4,761,871 A | 8/1988 | O'Connor et al. |
| 10,385,899 B2 * | 8/2019 | Germann |

FOREIGN PATENT DOCUMENTS

| DE | 26 41 804 | 3/1978 |
| EP | 2 359 955 | 8/2011 |

(Continued)

*Primary Examiner* — James D Sells
(74) *Attorney, Agent, or Firm* — Rankin, Hill & Clark LLP

(57) ABSTRACT

A method of bonding a connector to a first object includes providing the connector, the connector being separate from the first object and including a thermoplastic material; arranging the first object and the connector relative to one another so that the connector reaches from a proximal side of the object through a first opening in the object; generating and applying vibrations and mechanical pressure to the connector until a flow portion of the thermoplastic material is liquefied and caused to flow sideways radially into an open space; and removing the source of the vibrations and causing the liquefied thermoplastic material to re-solidify, resulting in the connector with a foot portion, a head portion, and a shaft portion between the foot portion and the head portion. The shaft portion extends along an axis through the first opening, and secures the connector to the first object.

25 Claims, 12 Drawing Sheets

(51) Int. Cl.
    *B29C 65/08*     (2006.01)
    *B29C 65/60*     (2006.01)
    *B29C 65/00*     (2006.01)
    *F16B 5/04*     (2006.01)
    *B21J 15/14*     (2006.01)
    *F16B 11/00*     (2006.01)
    *B29L 31/30*     (2006.01)
    *B29C 65/16*     (2006.01)
    *B29C 65/56*     (2006.01)
    *B29L 31/00*     (2006.01)

(52) U.S. Cl.
CPC ........ *B29C 66/0242* (2013.01); *B29C 66/721* (2013.01); *F16B 5/04* (2013.01); *F16B 11/006* (2013.01); *B29C 65/088* (2013.01); *B29C 65/1612* (2013.01); *B29C 65/562* (2013.01); *B29C 65/602* (2013.01); *B29C 65/603* (2013.01); *B29C 66/1122* (2013.01); *B29C 66/21* (2013.01); *B29C 66/41* (2013.01); *B29C 66/474* (2013.01); *B29C 66/524* (2013.01); *B29C 66/723* (2013.01); *B29C 66/727* (2013.01); *B29C 66/7212* (2013.01); *B29C 66/7392* (2013.01); *B29C 66/73117* (2013.01); *B29C 66/742* (2013.01); *B29C 66/7422* (2013.01); *B29C 66/81423* (2013.01); *B29C 66/81429* (2013.01); *B29C 66/81431* (2013.01); *B29C 66/8322* (2013.01); *B29C 66/83221* (2013.01); *B29C 66/863* (2013.01); *B29C 66/92445* (2013.01); *B29C 66/92921* (2013.01); *B29L 2031/3055* (2013.01); *B29L 2031/3076* (2013.01); *B29L 2031/7098* (2013.01)

(58) Field of Classification Search
USPC ....................................................... 156/73.1
See application file for complete search history.

(56) References Cited

FOREIGN PATENT DOCUMENTS

| | | |
|---|---|---|
| FR | 2 419 689 | 10/1979 |
| FR | 2 974 867 | 11/2012 |
| GB | 2 205 374 | 12/1988 |
| JP | 57-134116 | 8/1982 |
| WO | 98/42988 | 10/1998 |
| WO | 00/79137 | 12/2000 |
| WO | 2008/095327 | 8/2008 |

* cited by examiner

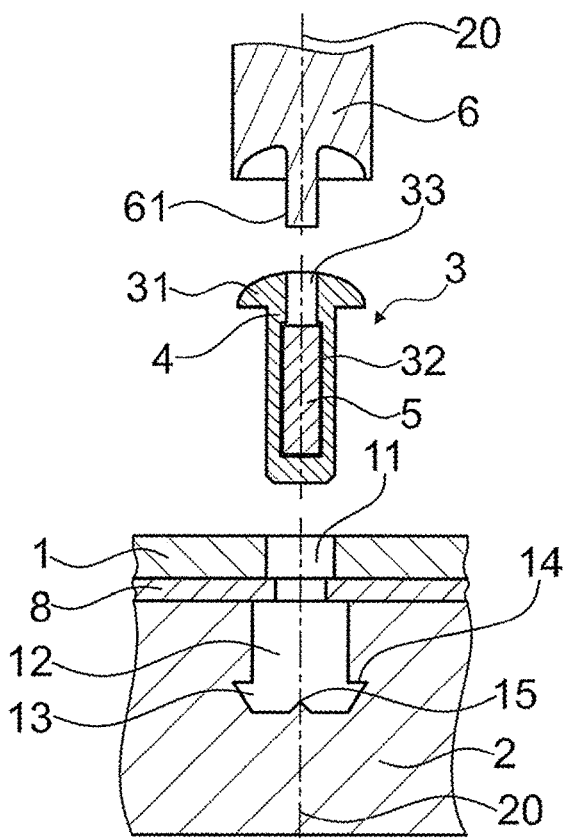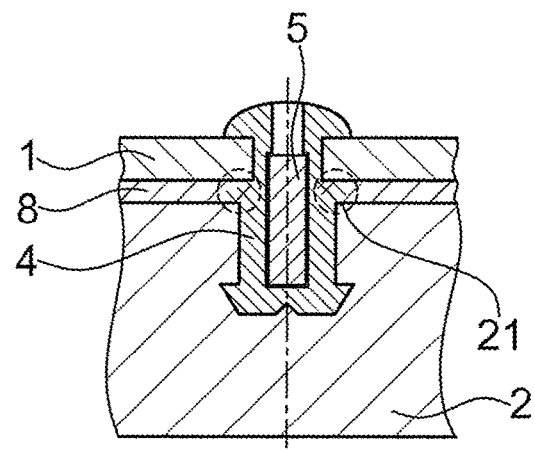
Fig. 1a
Fig. 1b
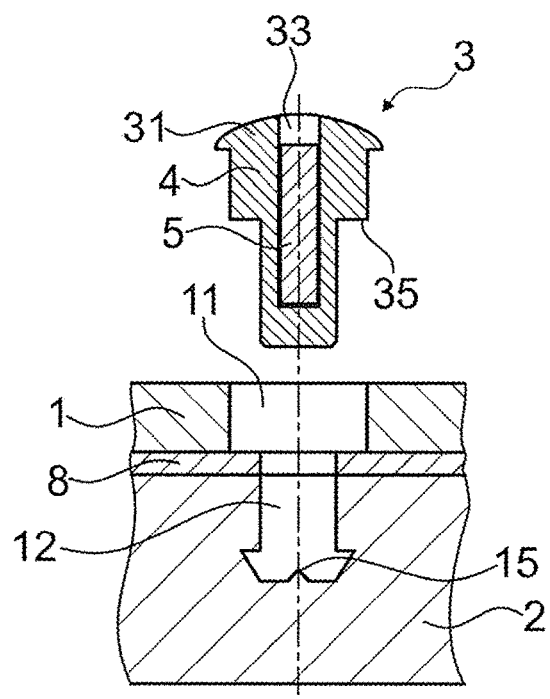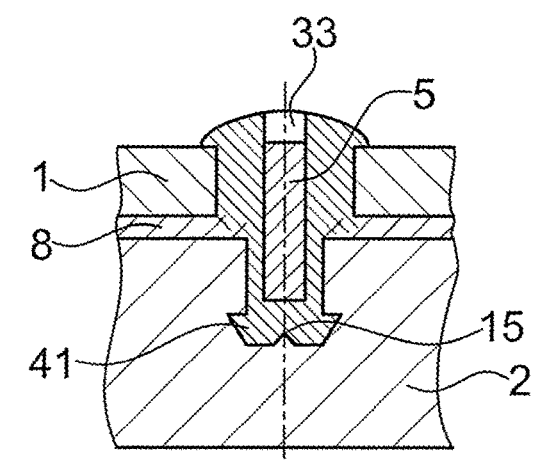
Fig. 2a
Fig. 2b

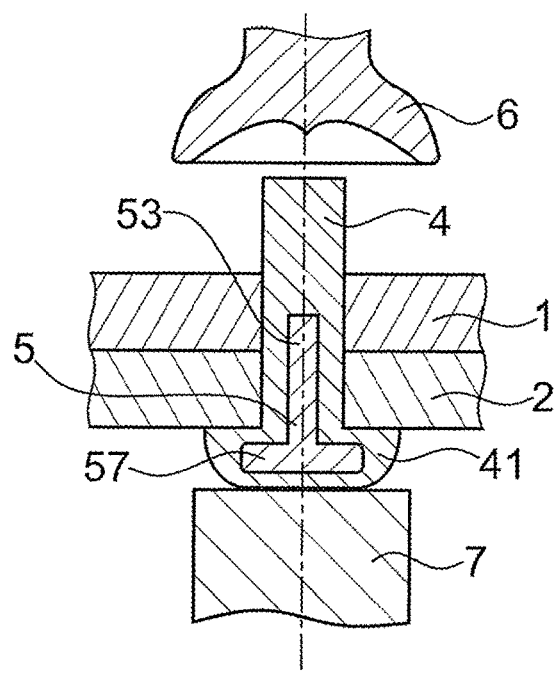
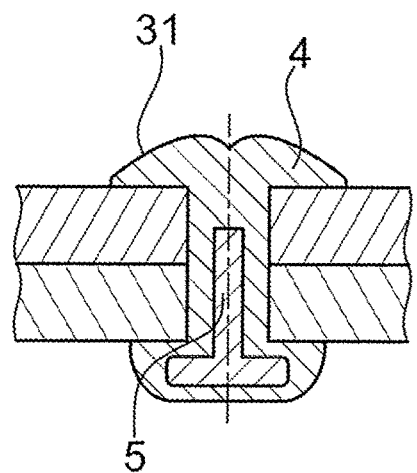
Fig. 17a    Fig. 17b
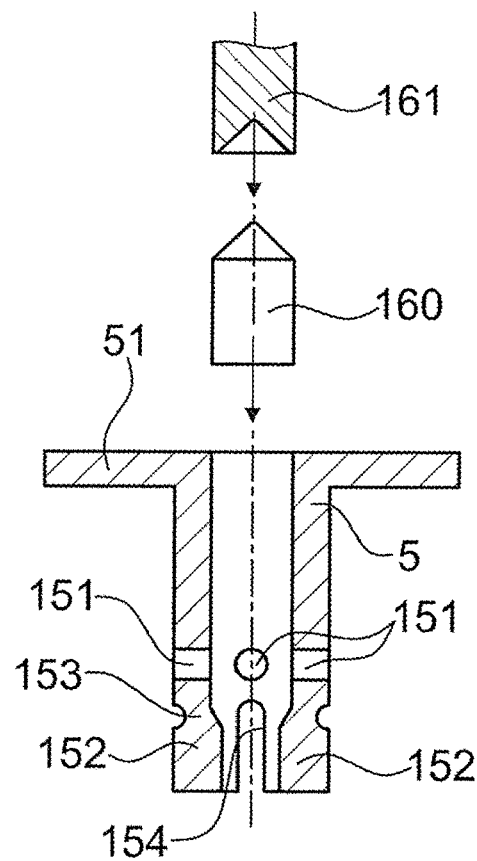
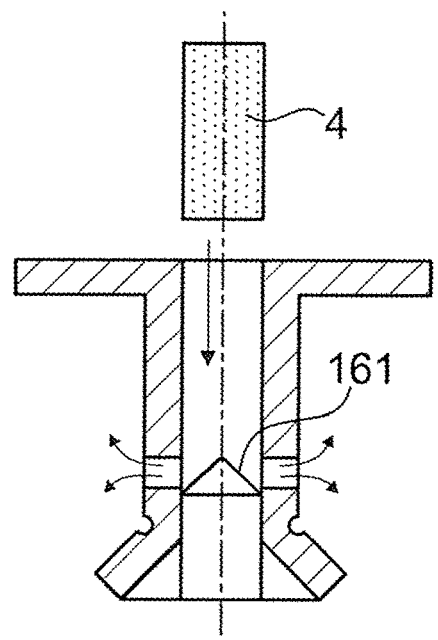
Fig. 18a    Fig. 18b

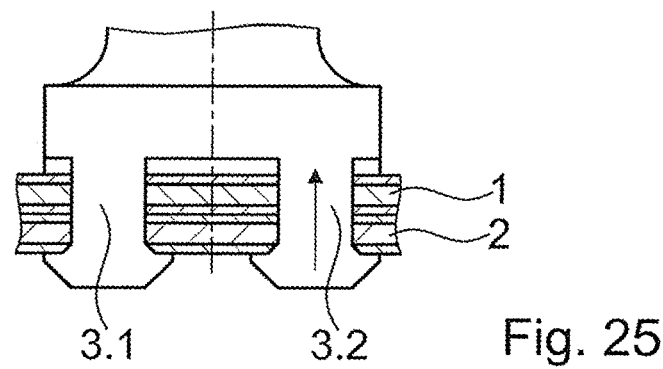
Fig. 25
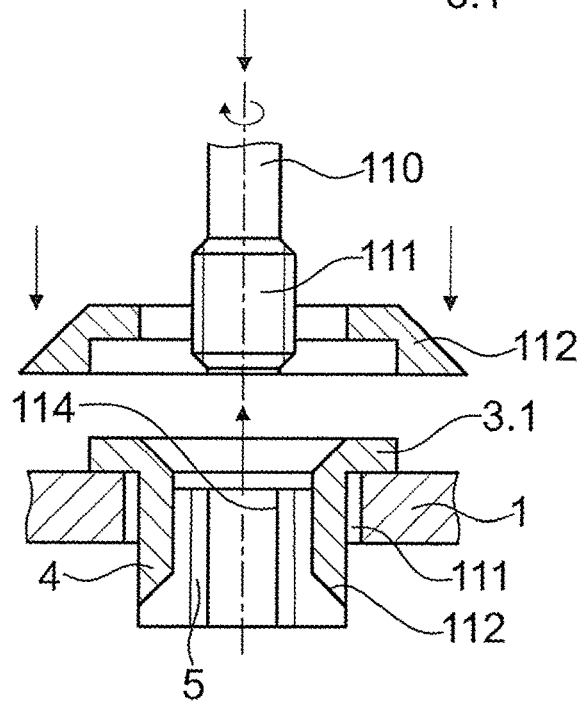
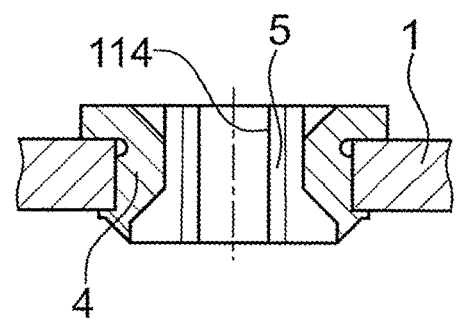
Fig. 26a        Fig. 26b
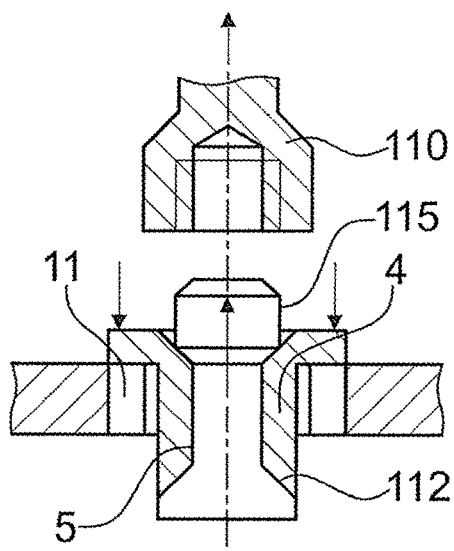
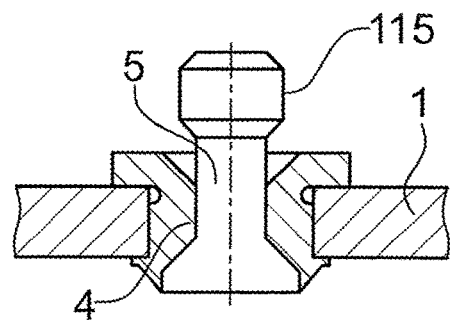
Fig. 27a        Fig. 27b

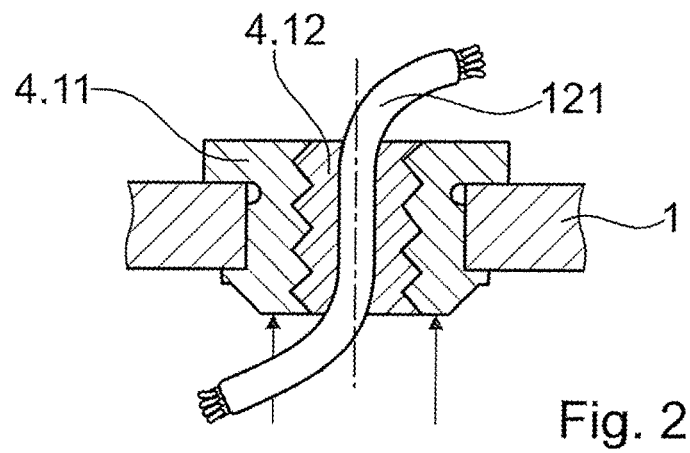
Fig. 28
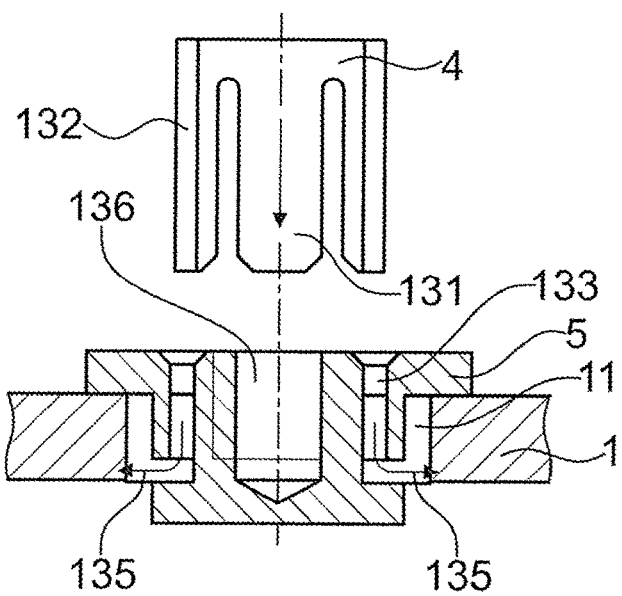
Fig. 29
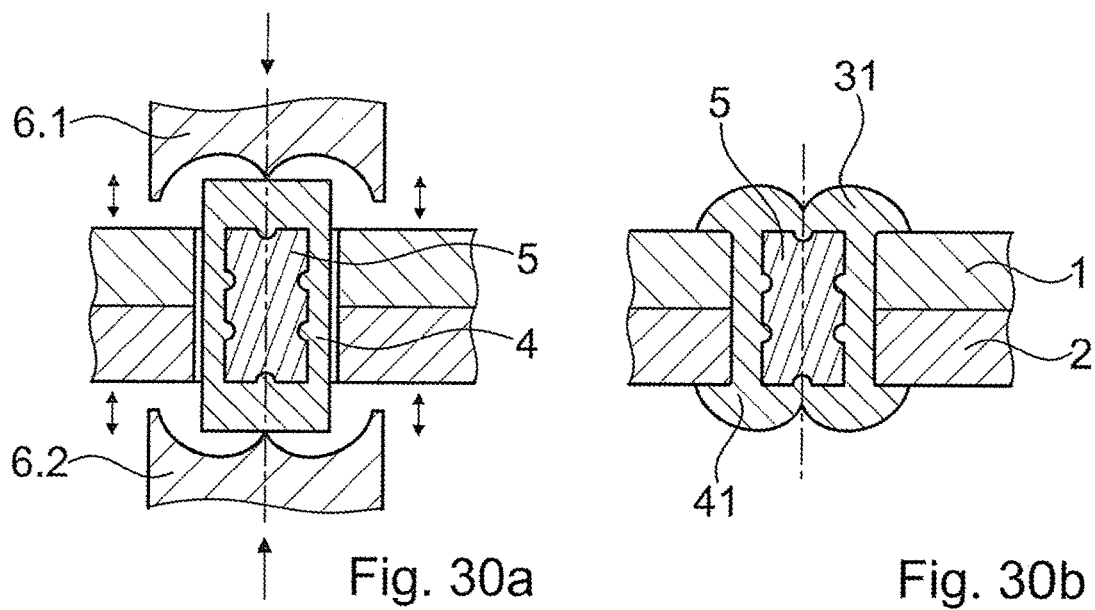
Fig. 30a                    Fig. 30b

BONDING OBJECTS TOGETHER

BACKGROUND OF THE INVENTION

Field of the Invention

The invention is in the fields of mechanical engineering and construction, especially mechanical construction, for example automotive engineering, aircraft construction, shipbuilding, machine construction, toy construction etc.

Description of Related Art

In the automotive, aviation and other industries, there has been a tendency to move away from steel constructions and to use lightweight material such as aluminium or magnesium metal sheets or die-cast parts, or carbon fiber reinforced polymers instead.

The new materials cause new challenges in bonding elements of these materials—especially of bonding flattish objects (such as panels or boards) together or bonding a flattish object and an other object together, such as bonding a flattish object to another object, or bonding a connector to a flattish object.

Difficulties especially arise if objects of different materials are to be connected, such as two materials of the group including steel, aluminium, magnesium, fiber reinforced polymers—together. Conventional rivet connections with metallic rivets firstly suffer from the drawback that the electrochemical potential of some of these materials is strongly different with differences corresponding to several volts, so that there will be substantial galvanic corrosion. Also, connections involving flat objects of fiber reinforced polymers suffer from the additional drawback that the out-of-plane Young's modulus of these materials is very low, and the friction force arising from the compression of the objects between the rivet head and rivet foot does not substantially contribute to the mechanical stability of the connection. (In this text, generally the broadening at the end from which the rivet is accessed for a deformation process is called "head", whereas the broadening at the other, distal end is called "foot". In literature, often both ends of the rivet are called 'heads'.)

It has been proposed to use a lacquer on metallic rivets to electrically insulate the metallic rivets from the object they are bonded to. However, lacquer may become brittle over time, especially when subject to long-time mechanical wear due to vibration, or it can dissolve.

For connections between thermoplastic objects, it has further been proposed to shape a rivet shaft as part of one of the objects to be joined and to form a rivet head after positioning relative to the other object by ultrasonic deformation. However, this kind of connection is restricted to bonding thermoplastic materials and not suited for solving the above-mentioned problems.

To solve these problems, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond.

SUMMARY OF THE INVENTION

It is an object of the present invention to bond a (mechanical) connector to an object with a first opening, the first opening being a through opening, the method overcoming drawbacks of prior art methods.

Also, it is an object to bond a connector to two objects with aligned openings, the connector thereafter bonding the two objects together.

It is an other object of the present invention to provide a method of bonding two objects together with a mechanical connector, the method overcoming drawbacks of prior art methods and being especially suited for bonding objects together that so far could not be bonded by metallic rivets due to corrosion and other problems. It is a further object to provide equipment for carrying out the method.

According to a first aspect of the invention, a method of bonding a connector to a first object comprises:
  providing the first object with a first opening, the first opening being a through opening;
  providing the connector, the connector being separate from the first object, the connector including a thermoplastic material;
  arranging the first object and the connector relative to one another so that the connector reaches from a proximal side through the first opening;
  using a source of mechanical vibrations to generate vibrations, and applying the vibrations and mechanical pressure to the connector until, under the effect of the vibrations and the pressure, a flow portion of the thermoplastic material is liquefied and caused to flow sideways radially into an open space; and
  removing the source of the vibrations and causing the liquefied thermoplastic material to re-solidify;
  wherein after the step of removing, the connector includes a foot portion, a head portion, and a shaft portion between the foot portion and the head portion, the shaft portion extending along an axis through the first opening, and thereby securing the connector to the first object;
  wherein the flow portion forms at least a part of the foot portion or the head portion or both, the foot portion and the head portion; and
  wherein at least one of the following conditions is fulfilled:
    the connector in addition to the thermoplastic material includes a body of a material that is not liquefiable or liquefiable only at substantially higher temperatures than the thermoplastic material;
    the step of applying the vibrations and the pressure includes coupling the vibrations through a proximal coupling-in face of the connector and transmitting the vibrations through the connector to a distal end face of the connector.

In this, the body of the not liquefiable material is different from a mere filler of a large number of particles but is a macroscopic body with a defined position and orientation and of a substantial size of for example at least 10% of a connector volume, and/or with a characteristic dimension of at least 0.1 mm in any dimension. Especially, the body may be metallic or of ceramics. Especially, the body may be such as to have a defined shape and to thereby add stiffness to the connector. By the body, the connector is defined into at least two spatially separated regions, namely the body region and the thermoplastic region.

The method may further include providing a second object, the second object having an opening, wherein in the step of arranging includes arranging the first and the second objects and the connector relative to one another so that the first and second openings are aligned and that the connector reaches from a proximal side through the first opening distally into the second opening, and wherein the first and second objects are secured together by the connector after the step causing the liquefied thermoplastic material to resolidify:

According to a second aspect, the invention also concerns a method of bonding a first object and a second object together, the method including:

providing the first object with a first opening and the second object with a second opening, at least the first opening being a through opening;

providing a connector separate from the first and second objects, the connector including a thermoplastic material;

arranging the first and second objects and the connector relative to one another so that the first and second openings are aligned and that the connector reaches from a proximal side through the first opening distally into the second opening;

using a source of mechanical vibrations to generate vibrations, and applying the vibrations and mechanical pressure to the connector until, under the effect of the vibrations and the pressure, a flow portion of the thermoplastic material is liquefied and caused to flow sideways radially into an open space; and removing the source of the vibrations and causing the liquefied thermoplastic material to re-solidify;

wherein after the step of removing, the connector includes a foot portion, a head portion, and a shaft portion between the foot portion and the head portion, the shaft portion extending along an axis through the first opening and through at least a part of the second opening, and thereby securing the first and second objects together;

and wherein the flow portion forms at least a part of the foot portion or the head portion or both, the foot portion and the head portion.

Generally, pertaining to various embodiments of the invention, the flow portion of the thermoplastic material is the portion of the thermoplastic material that during the process and due to the effect of the mechanical vibrations is caused to be liquefied and to flow. In some embodiments of the method, all thermoplastic material of the connector may be caused to flow, i.e. the flow portion is the entire thermoplastic material. In other embodiments, the process parameter—especially the time during which energy in the form of mechanical vibrations is coupled into the arrangement—may be chosen so that not all thermoplastic material is liquefied.

The head portion and the foot portion are shaped to keep the connector at its place relative to the first and, if applicable, second objects. Especially, they secure the connector against escaping into axial directions—the foot portion secures the connector against movements into proximal directions by resting against a distally-facing surface of the second object, whereas the head portion secures the connector against movements into distal directions by resting against a proximally facing surface portion of the first object.

In embodiments in which the method includes providing two objects, the shaft portion will be arranged such that it traverses, in the aligned first and second openings, the shear plane between the first and second objects. If the first and second objects in the vicinity of the openings do not directly rest against each other, this implies that the shaft traverses both, the plane defined by the surface of the first object next to the opening and facing towards the second object and the plane defined by surface of the second object next to the opening and facing towards the first object.

Due to this arrangement, in these embodiments the connector fulfills the function of a rivet. It can secure the first and second objects together in by one or more of the following mechanisms:

The shaft portion traversing the shear plane between the objects secures the objects against shear movements.

The head and foot portions cause the first and second objects to rest against each other.

Depending on the chosen material, the securing together by the head and foot portions may be under some stress so that an interference fit of the first and second objects, causing further resistance against shear movements results.

In embodiments, the first and second openings as well as the shaft portion can have a cross section that is different from circular. Then, the connector also secures against rotational movements.

For the first and second objects, one or more of the following conditions may hold:

the first and second objects are of different materials;

at least one of the first object and of the second object includes a fiber reinforced composite material.

It is also possible that the first and second objects are of a same material. In general, in addition to preventing corrosion, possible advantages of the approach according to the invention may include:

the compensation of tolerances, the connecting, for example of easily deformable and/or delicate first and second objects, with small forces, damping, weight reduction, material properties and/or cost optimization (for example, the density and cost of a connector with a non-liquefiable body may be comparable with a composite prior art dowel but does not have its disadvantages);

avoiding anisotropy, etc.

In addition or as an alternative to securing at least two objects (the first and second objects) together, the connector may also serve at least one further purpose.

A first such further purpose is the purpose of serving as an anchor for attaching other objects. To this end, the body of the not liquefiable material (in in this text, "not liquefiable" unless otherwise specified includes "liquefiable only at substantially higher temperatures than the thermoplastic material") may have a portion accessible from an outside, such as a rod with a thread or a rod serving as part of an other mechanical connection, or an opening with an inner thread (nut rivet) or other mechanical connection, etc.

In a group of embodiments serving this further purpose include forming the foot portion between the first object with the first opening and a second object, the second object serving as counter element in the foot forming step.

A second such purpose is sealing a proximal side from a distal side. For example, the body of the not liquefiable material may then include a lead through at least the first object.

The fit between the connector and the first and (if applicable) second objects will generally not be a weld. The material of the first and second objects that come into contact with the connector will not be of thermoplastic material or be of a thermoplastic material that liquefies only at substantially higher temperatures than the thermoplastic material of the connector so that during the process it does not liquefy.

However, an additional thermoplastic element that welds to the connector may be provided. Especially, a thermoplastic separating layer between the first and second object may be present. Such a separating layer may be provided as a coating of one or both of the objects or additionally or alternatively as separate foil. It may among others have the advantage that it defines a galvanic separation of the first and second objects, beneficial for example if these objects are both of electrically conducting, but different materials. In such a case, it may be advantageous to perform the method in a manner that the separating layer welds to the thermoplastic material of the connector. For example, a weld between these may be continuous around a full periphery of the connector so that a complete seal is formed. This may be a good protection against corrosion for example due to saltwater to which the connection may be exposed.

In addition or as an alternative to this kind of seal, the method may be carried out to provide a seal between the circumferential walls of the first and second openings (or of at least one of them) on the one hand and the thermoplastic material of the connector on the other hand. To this end, the process may be carried out in a manner that thermoplastic material of the connector is not only liquefied to form the foot portion and/or the head portion, but also to coat said circumferential wall(s), to get into intimate contact with it and to fill possible irregularities/structures of the first and/or second objects or gaps between the first and second object. In this second way, a seal protecting the connection against corrosion or other influences is formed. While it is not necessary that all regions of the wall are coated in this step, in order for this seal to fulfill its function, it is often necessary that the circumferential wall is coated at least along a full circumference.

Generally, in the step of causing the thermoplastic material to be liquefied, liquefaction can be caused to an extent that the liquefied material loses any memory of the shape it had before liquefaction, i.e. to an extent that goes beyond a mere plasticization.

In a first category of embodiments, the in the step of generating vibrations, the vibrations are generated on the proximal side and transmitted to a distal side, wherein the flow portion forms at least a part of the foot portion—in other words vibrations generated on the first object side or the "frontside" are caused to form the foot portion or assist forming the foot portion on the second object side or the "backside".

In this, the head portion may be pre-formed, i.e. provided as a feature of the connector in its initial shape, before it is arranged relative to the first and second objects. Alternatively, the head portion may be formed by deforming the connector after arranging it relative to the first and, if applicable, second objects. In accordance with this alternative, especially the method may include a two-phase process. In this, firstly the distal end of the connector is deformed into a foot portion and thermoplastic material at the proximal end is caused to flow until the head portion is formed.

The mechanical vibrations may be coupled—in a "forward" configuration—into the connector from a coupling-in face on the proximal side against which a distally-facing face of a sonotrode—coupled to the source of the vibrations—is pushed. The mechanical vibrations thus then are transmitted through and predominantly by the connector itself.

In an other, "rearward", configuration, the sonotrode, which is used to apply the vibrations to the thermoplastic material of the connector, is subject to a pulling force. To this end, the sonotrode will include a shaft reaching past or through the thermoplastic connector material, with a distal, proximally-facing coupling out face in contact with a distally-facing distal coupling-in face of the thermoplastic connector material. Such a sonotrode after the step of applying the vibrations may be removed or may alternatively serve as a (not thermoplastic) part of the connector.

In a first group of embodiments of the first category of embodiments with a first and a second object connected to each other, the second opening is a through opening. Then the open space is a space distally of the second object and/or includes a broadening of the second opening, such broadening defining an undercut.

In a second group of embodiments with a first and a second object connected to each other, the second opening is a blind opening. Then, the open space may be a cavity with an undercut belonging to the second opening.

In a second category of embodiments the connector is provided with a pre-manufactured foot portion, inserted from the distal side, and the vibrations are caused to form the head portion. In this, liquefaction is caused in direct contact between the sonotrode and the thermoplastic material at the proximal end face of the connector.

In embodiments of this second category with first and second objects connected to each other, both, the first and second openings are through openings, In a further, third category of embodiments that combines both, aspects and features of the first category and of the second category, vibrations are applied from both sides, for example simultaneously. In these embodiments, the second opening (if any) will be a through opening.

One side (that will usually then be defined as the distal side), or both sides of the connector is/are introducible into the openings and will, by the applying, be deformed into the final foot portion/head portion shape, respectively that extends, into at least one radial direction, further than the opening. To this end, the corresponding (distal/proximal) sonotrode or an according counter element (in the first and third category) may be provided with a mould feature that defines the shape of the head portion/foot portion.

Such optional mould feature of the sonotrode or possibly of a counter element—this also pertains to other categories of embodiments—may for example be an indented surface portion, with a stop surface portion that abuts against the first/second object surface during the process, next to it.

In a special group of embodiments, instead of the sonotrode and/or the counter element having a mould feature, or in addition thereto, the first and/or (if applicable) second object may have an outer surface with an indentation next to the opening. Especially, such an indentation may surround the outer rim (the mouth) of the opening. By this, if the sonotrode and/or the counter element, respectively, has a flat surface, the connector after the process may be flush with the outer surface of the respective object. This may be the case for a pre-formed head (or foot) portion, as well as with a head or foot portion formed including thermoplastic material of the flow portion.

In embodiments in which the method is carried out in an automated manner, the vibrations may, for example, by applied by vibration generating tools guided by robot arms. In addition or as an alternative, tools that apply the vibrations on the two sides may be arranged in a clamp-like arrangement.

In embodiments of all categories and groups of embodiments, one or more of the following options may be realized:

In accordance with a first option, the connector has a flowing zone in which by the effect of the mechanical vibrations the material, having thermoplastic properties, is liquefied, and a non-flowing zone in which the material is not liquefied. The flowing and non-flowing zones are at least partially parallel to one another, in that they extend alongside each other in the proximodistal direction, i.e. there is a region that is extended along the proximodistal axis in which the cross section perpendicular to the proximodistal axis includes both, portions of the flowing zone and of the non-flowing zone. This region may, for example, extend along an entire length of the shaft portion, or it may extend at least along an entire length of the first opening or at least along an entire length of the second opening or of a small diameter portion of the second opening.

Especially, the flowing zone may surround the non-flowing zone in a cross section perpendicular to the proximodistal axis and thereby shield the non-flowing zone from at least one of the first and second objects so that there is no direct contact between the non-flowing zone and either the first or the second object or both.

In accordance with a first sub-option, the non-flowing zone includes the mentioned body of a material that is not liquefiable or liquefiable only at substantially higher temperatures than the thermoplastic material. For example, such a body may be of a metallic or ceramic material, or of a thermoset plastic material, or of a thermoplastic material liquefiable at a much higher temperature, in both cases possibly reinforced by an appropriate filler, such as carbon fibers.

Such a body may especially be a core. Such a core may be surrounded at least in a shaft region by the thermoplastic material or other electrically insulating material.

A core of this kind may, for example, have at least one of the following properties:

The core may have, on an outer surface, especially on a surface portion essentially running parallel to the proximodistal axis, at least one locking feature, for example a porosity, an indentation, a protrusion, a corrugation, a thread or similar. Such a locking feature may be embedded in the thermoplastic material initially (i.e. when the connector is provided), or become embedded in the thermoplastic material by portions of the thermoplastic material that are flowable during the process and thereby interpenetrate the locking features. The interpenetrated locking features stabilize the core within the connector.

The core may include a proximal and/or distal guiding indentation cooperating with a corresponding protrusion of the tool or counter element (such as of the mould portion) to stabilize the orientation and lateral position of the core during the process.

The core may have an axial extension corresponding to the thickness of the first object in the region around the first opening (if the connector is fastened to one object only), or the cumulated thickness of the first and second objects (if the connector is fastened to a first and second object to be fastened to each other).

As an alternative to being a core, such a body may be a sheath element with a longitudinal opening open to the proximal side and with at least one lateral exit opening through which the lumen in the longitudinal opening communicates with the circumferential periphery of the sheath element. The thermoplastic material may then be provided as a thermoplastic filling of the longitudinal opening or may alternatively be provided as a separate thermoplastic element insertable from the proximal side into the longitudinal opening. A sonotrode for applying the vibrations may then be shaped to be pressable against the proximal end face of the thermoplastic material and to have a distal end portion insertable into the longitudinal opening to press the thermoplastic material further into the longitudinal opening and out of the lateral opening (exit opening).

In further embodiments, the body may have any other suitable shape, including a shape with a pre-formed head or foot portion, etc.

In accordance with a group of embodiments of the first sub-option, method may include the step of deforming a part of the body after the step of arranging and prior to and/or during the step of applying the mechanical vibrations to liquefy thermoplastic material of the connector. This step of deforming may especially include an expansion, i.e. an outward deformation. Especially, the in situ deformed part may include a distal broadening distally of the shaft portion and belonging to the foot portion if the connector is introduced from the proximal side and/or a proximal broadening proximally of the shaft portion and belonging to the head portion if the connector is introduced from the distal side. By this, the body may contribute to the clamping effect of the connector. The spread feature may extend into at least one radial direction further than the cross section of the shaft portion.

Mechanically deformable connectors, especially plastically deformed metal rivets, have been known in the art for a very long time. Embodiments of this group of embodiments, like all other embodiments of the present invention that include a body of a non-liquefiable material, however, have a significant advantage over the prior art. Due to the combination of a, for example, metallic (or ceramic or hard plastic or glass etc.) body with the approach of liquefying the thermoplastic material and causing it to re-solidify, the advantages of the material properties of the non-liquefiable material, such as high shear force resistance, high ductility, or also, depending on the application, other properties like electrical conductivity etc. may be used.

Nevertheless, due to the approach of "freezing" flown thermoplastic material, the connector is adapted in its shape to the object(s) in a relaxed state, without any re-setting forces. This is in contrast to for example metallic rivets where in any deformation there is an elastic portion, and as soon as the deforming force stops, the deformed part (rivet part) will tend to a slight movement away from the object (spring back effect) against which it is pressed. In connections of metal rivets to a metal object, this is solved by over-pressing the deformed rivet part into the metal to which it is connected, resulting in a further connection and considerable residual stresses in the rivet and/or the sheet material. However, this is not an option for, for example, non-metallic objects. Due to the approach according to the here-discussed embodiments of the invention, this problem is solved, and an intimate connection between the object and the connector results independent of the material properties of the object. Any re-setting force by a metallic body of the connector may only act within the connector and does not have any influence on the connection.

Especially, in embodiments, the spread feature may include a plurality of outward bendable arms or similar.

In accordance with a second sub-option, the non-flowing zone is of the thermoplastic material (especially with fiber reinforcement) but the process parameters are chosen so that the material is not liquefied in the non-flowing zone. To this end, for example the circumference of the connector may be cause to be in contact with the circumferential wall of the opening and the mechanical vibrations may cause friction between the circumference and the circumferential wall, which friction causes the material to liquefy. The process then is stopped before the connector is liquefied in the interior, i.e. in the non-flowing zone.

In this second sub-option, the connector especially in the non-flowing zone may be made of a fiber reinforced material with an oriented fiber reinforcement, especially with axially oriented fibers.

Especially (but not only) in accordance with the second option, the thermoplastic material of the connector may be caused to flow in a manner that a seal is formed with the circumferential wall, i.e. there is no remaining space between at least a region of the circumferential wall of the first and/or second opening and the connector after the process of liquefying.

In accordance with a further group of embodiments, the liquefaction of the thermoplastic material includes a two-stage process. In these embodiments, the connector includes two kinds of thermoplastic material forming a first and a second thermoplastic material portion. The connector is configured so that when after the step of arranging the vibrations and the mechanical pressing force are applied to the connector, firstly the first thermoplastic material portion is excited and starts liquefying (in this text, "liquefying generally refers to a change of state that reduces the viscosity to an extent that the material is at least plastically deformed by the applied pressing forces). Due to the deformation arising in the process, the second thermoplastic material portion comes into contact with non-vibrating portions (for example of the object(s) or of a counter element) and starts liquefying also, wherein the first thermoplastic material portions may be arranged to confine the flow of the second thermoplastic material portions. More in particular, the second thermoplastic material portions in this may be softer and/or have a lower glass transition temperature than the first thermoplastic material portions and serve as a seal or as a connector portion that maintains elasticity even at low temperatures. Furthermore, the second thermoplastic material may include reactive components that are able to form an adhesive or cohesive bond to the object(s) coming in contact with.

In this further group of embodiments, the first thermoplastic material portion may especially form a circumferential flange that, when in contact with an end face of the first and/or (if applicable) second object, forms a flow confiner for the second thermoplastic material portions.

A first example of a pairing of two kinds of thermoplastic material for the first and second thermoplastic material portions are a thermoplastic material with a relatively high glass transition temperature, such as PEEK or ABS, in combination with a hot-melt adhesive. A second example is thermoplastic material in combination with an elastomer, especially with a thermoplastic elastomer.

In embodiments of this further group of embodiments (this also pertains to the according connector with two kinds of thermoplastic materials described hereinbelow) the first thermoplastic material have the purpose of providing the structure/mechanical stability of the connection (possibly together with the non-liquefiable body if applicable), whereas the second thermoplastic material may have the function of sealing and/or damping.

In a sub-group A of embodiments, there may be differences in the melting viscosity at a given liquefaction temperature. For example, the viscosity of the first thermoplastic material may be higher than the viscosity of the second thermoplastic material by at least a factor of 10, or by at least a factor 100. Example: the first thermoplastic material may have about 30% (weight percent) or more of a filler, for example ABS with glass fiber reinforcement, whereas the second thermoplastic material does not have a filler (for example native ABS). Another example: the first thermoplastic material may be highly crystalline HDPE or UHM-WPE, whereas the second thermoplastic material may be low crystalline LDPE. Yet another example: the first thermoplastic material may be PEEK, and the second thermoplastic material may be Polycarbonate.

In a sub-group B of embodiments, there may be strong differences in the modulus of elasticity. For example, the modulus of elasticity (Young's modulus) of the first thermoplastic material may be at least 0.5 GPa, whereas the modulus of elasticity of the second thermoplastic material may be at most 0.05 GPa. Example: The first thermoplastic material may be Polycarbonate or PET or ABS or Polyamide (PA 6, 66, 11, 12), and the second thermoplastic material may be a Polyurethane elastomer (elastomers are especially interesting for their damping properties).

In a sub-group C of embodiments, the molecular weight may strongly differ. For example, the molecular weight of the first thermoplastic material may be larger than the molecular weight of the second thermoplastic material by at least a factor 10 or at least a factor 100 (with otherwise, for example, same compositions). Examples include Polyethylene, Polypropylene.

Features of the sub-groups A, B, C, may be combined in that material pairings having properties of sub-groups A and B, sub-groups A and C, or sub-groups B and C, or all of A, B, and C, may exist.

The invention also concerns a connector for being used in embodiments of the above-discussed method, the connector including a thermoplastic material and a body of a body of a material that is not liquefiable or liquefiable only at substantially higher temperatures than the thermoplastic material, the connector extending between a head end and a foot end along a longitudinal shaft axis, the body including deformable portion being a head end and/or foot end portion being deformable by bending outwardly with respect to the axis under the effect of a pressing force and mechanical vibrations acting on an end face of the connector, wherein the thermoplastic material is arranged to at least partially encompass the deformable portion after deforming by the pressing force and the mechanical vibrations.

In this, the body may initially be at least partially embedded by the thermoplastic material.

Also the thermoplastic material may be arranged to at least partially encompass the deformable portion after deforming the pressing force and the mechanical vibrations by having become flowable, flowing, and becoming re-solidified.

The connector may be a connector for being used in embodiments described herein, and the properties of connectors described in this text referring to various different embodiments of the invention, including embodiments without a deformable body portion, are optional features of the connector also, including locking and flow directing features, circular or non-circular shapes, etc.

The invention further concerns a connector for being used in embodiments of the above-discussed method, the connector including two kinds of thermoplastic material forming a first and a second thermoplastic material portion, wherein the second thermoplastic material portion is softer and/or has a lower glass transition temperature than the first thermoplastic material portion and/or includes a reactive component that is able to form an adhesive or cohesive bond to the object(s) it comes in contact with, wherein the second thermoplastic material portion forms a part of a surface of the connector.

For example, the second thermoplastic material portion may form a collar around an axis (proximodistal axis; parallel to an axis of the through opening in the assembled state) of the connector. Especially, the connector may have a shaft portion extending along the axis, and the second thermoplastic material may form a collar around the shaft portion.

In embodiments, the connector has a head portion with a distally protruding outer flange of the first thermoplastic material at least partially encompassing the second thermoplastic material portion.

Thereby, the first thermoplastic material portion is arranged to confine the flow of the second thermoplastic material portion.

In embodiments, the connector further includes a body, especially a core, of a not liquefiable material.

Generally, various embodiments of connectors described herein may include a thermoplastic material (and optionally also a second thermoplastic material) with a non-liquefiable body, wherein the body may include at least one of:

At least one locking feature on its lateral surface, such as an indentation, a corrugation, a porosity, etc., which locking feature cooperates with thermoplastic material surrounding it to stabilize the position, especially axial position, of the body within the embedding thermoplastic material. Such a locking feature may be embedded in the thermoplastic material initially (i.e. when the connector is provided), or become embedded in the thermoplastic material by portions of the thermoplastic material that are flowable during the process and thereby interpenetrate the locking features;

A proximal guiding indentation and/or a distal guiding indentation or protrusion, cooperating with a guiding protrusion or guiding indentation, respectively, of the sonotrode or mould to define a position of the body during the process.

In all categories and groups of embodiments of the method and/or the connector according to the invention, the connector and/or (if applicable) the body (core, sheath or the like) of the connector and/or the openings can be rotationally symmetric about the axis—in the case of a body in the form of a sheath with the exception of the exit openings. Alternatively, the connector and/or the body (if applicable) and/or the openings or one of the openings can have a shape deviating from rotational symmetry. By this, in addition to securing against shear movements and against axial relative movements, the connection may also secure against rotational relative movements.

In all categories and groups of embodiments, the connector may be solid instead of tubular. Alternatively, the connector can also be tubular, i.e. include an axial through opening. Such axial through opening may in special applications be used as feedthrough or venting opening or similar.

In all categories and groups of embodiments, the method may be carried out by an apparatus for an automated bonding. Especially, the source of the mechanical vibrations may be provided guided by a robot arm for example.

Also, the apparatus may include means for automatically placing the connector in the aligned openings. For example, a robot arm or other tool that holds the source of the vibrations may be provided with an automatic feed for the connector. For example, the feed may include a magazine for connectors and a separating and feeder unit for feeding the connectors one after the other to the arranging place.

Accordingly, the invention also concerns an apparatus having the means and being configured to carry out the inventive method in an automated manner.

Mechanical vibration or oscillation suitable for methods and devices according to aspects of the invention preferably has a frequency between 2 and 200 kHz (even more preferably between 10 and 100 kHz, for liquefaction at the distal end or as far as the distal end between 15-30 kHz, for liquefaction at the proximal end (head forming) only between 15-70 kHz) and a vibration energy of 0.2 to 20 W per square millimeter of active surface. Such vibrations are, e.g., produced by ultrasonic devices as e.g. known from ultrasonic welding. The vibrating element (tool, for example, sonotrode) is, e.g., designed such that its contact face oscillates predominantly in the direction of the element axis (longitudinal vibration) and with an amplitude of between 1 and 100 μm, preferably around 10 to 30 μm. Rotational or radial oscillation is possible also.

The fact that the thermoplastic material is liquefied by mechanical vibration brings about the advantage that the process is potentially very fast. Tests have revealed that under the above-described conditions as short time as about 1 s or even as short as 0.5 s may be sufficient.

As explained hereinbefore in this text, embodiments of the method include transmitting the mechanical vibrations from a proximal contact face between a sonotrode and the connector through the connector to a distal portion. Some embodiments in addition or in contrast thereto include causing a liquefaction at the proximal interface or close thereto. If vibrations are to be transmitted to the distal end liquefaction at the interface with the sonotrode ("head melting") at least initially in many situation should be prevented. To do so, a common oscillating system of the sonotrode and the connector can be created. This is achieved by a strong mechanical coupling (such as by a strong pressing force) and/or a comparably long wavelength of the vibrations, i.e. a comparably low frequency. Especially, for dimensions characteristic for connectors of the herein discussed kind (connector length for example between 0.3 cm and 20 cm; diameters typically between 8-12 mm, corresponding to a coupling area of typically between 50 and 120 mm$^2$), the pressure by which the sonotrode is pressed against the connector may be chosen to be around 100-800 N, especially 200-500 N, and the frequency around 15-30 kHz. For liquefaction at the interface ("head melting"), the pressure may be reduced to for example less than 100 N. Also, possibly and depending on the vibration generating apparatus the frequency may be increased.

Generally, these parameters will depend on the geometry. For a given geometry, the skilled person knowing the teaching of the present invention and the above general rules may find the operation parameters (pressure-time profile, frequency) by testing.

The onset of liquefaction may further be controlled by geometrical structures in the form of energy directors as known from ultrasonic welding. Energy directors (or energy concentrating structures) may have the shape of ribs or humps or similar, either of the thermoplastic material or of the surface that comes into contact with the thermoplastic material. Generally, energy directors will be shaped to yield a comparably small interface area at the interface at which liquefaction is to set in to concentrate the vibration energy to this small area so that there will be a higher energy absorption per unit area that will cause a stronger heating. As soon as the temperature at these places is above the glass transition temperature, there will be enhanced internal friction, and this will further promote the energy absorption and liquefaction.

A further parameter that may be optionally used to control the spot where liquefaction sets in is its initial temperature.

Due to the fact that internal friction only becomes high when the local temperature is above the glass transition temperature, the efficiency of the liquefaction step (much like in prior art ultrasonic welding) goes up only when this temperature is achieved at some spot. Before this, the efficiency of the energy absorption—needed to bring the material locally above the glass transition temperature—is relatively lower. This fact may be used to exert a further control. More in particular, the method may optionally include the step of bringing a portion of the thermoplastic material above the glass transition temperature by local direct or indirect heating while other portions of the thermoplastic material remain below the glass transition temperature.

In this, direct heating may for example be achieved by directed irradiation, such as irradiation by a laser (e.g. infrared or red) at the desired place, immediately before the step of arranging or thereafter (if the geometrical configuration allows so).

Indirect heating may, for example, be achieved by heating of the region of the object with which the connector comes into contact, such as by local heating of the second object around the opening.

The step of heating is carried out at least before or during the step of applying. This implies that, for example, the heating step may also start before the step of applying and be continued for some time while the vibrations are applied.

In this text the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction, i.e. when arranged at one of a pair of surfaces (contact faces) being in contact with each other and vibrationally or rotationally moved relative to each other, wherein the frequency of the vibration has the properties discussed hereinbefore. In some situations, it is advantageous if the material has an elasticity coefficient of more than 0.5 GPa, especially if no non-liquefiable body is used.

For the thermoplastic material of the connector, especially at least one of the following three conditions may be met:

The glass transition temperature is above room temperature so that at room temperature the thermoplastic material is below the glass transition temperature. More in general, the glass transition temperature may be chosen to be above a temperature of intended usage.

The thermoplastic material is highly crystalline.

The thermoplastic material is itself fiber reinforced

Any combination of these is possible.

Thermoplastic materials are well-known in the automotive and aviation industry. For the purpose of the method according to the present invention, especially thermoplastic materials known for applications in these industries may be used.

Specific embodiments of materials are: Polyetherketone (PEEK), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers. Long fibers or continuous fibers may be used especially for the non-flowing portion.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

In this text, the terms "proximal" and "distal" are used to refer to directions and locations, namely "proximal" is the side of the connection from which an operator or machine applies the mechanical vibrations, whereas distal is the opposite side. The broadening of the connector on the proximal side in this text is called "head portion", whereas the broadening at the distal side is the "foot portion". For connectors with or without a pre-formed head portion that are inserted into the aligned openings from the proximal side, the distal end will be the end sometimes in literature referred to as the "tail end".

BRIEF DESCRIPTION OF THE DRAWINGS

In the following, ways to carry out the invention and embodiments are described referring to drawings. The drawings are schematic in nature, and the same reference numerals refer to same or analogous elements. The drawings show:

FIG. 1a an arrangement for carrying out the connecting process according to the invention;

FIG. 1b the arrangement of FIG. 1a after the process;

FIG. 2a elements of an alternative arrangement for carrying out the connecting process according to the invention;

FIG. 2b the arrangement of FIG. 2a after the process;

FIGS. 16a and 16b, and 17a, 17b further arrangements before and after the process;

FIGS. 18a-18c details showing an even further embodiment of the method according to the invention;

FIG. 25 a variant of a process according to the invention with a double foot connector;

FIGS. 26a and 26b an embodiment with a connector having an inner thread at the beginning of and after the process;

FIGS. 27a and 27b an embodiment with a connector having an outer thread at the beginning of and after the process;

FIG. 28 and embodiment of a connector serving as feedthrough;

FIG. 29 yet another embodiment; and

FIGS. 30a and 30b an embodiment in which two sonotrodes are used to form a head and a foot portion, respectively.

DESCRIPTION OF THE PREFERRED EMBODIMENTS

Figure 3A:
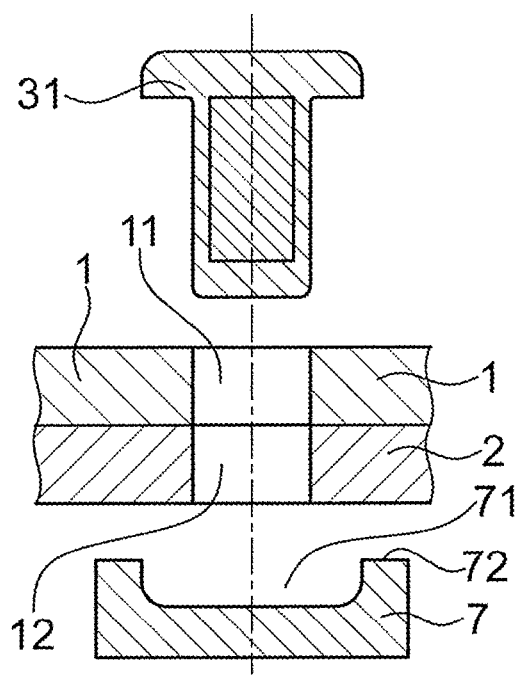
FIG. 3a elements of a further arrangement.

FIG. 1a depicts a basic set-up of embodiments of the invention. The first object 1 is a board or sheet, for example of a metal or of a fiber reinforced composite material. It has a first opening 11 being a through opening perpendicular to the board plane.

The second object 2 is, for example, either of a different material than the first object (for example, it may be of die-cast metal, such as die-cast magnesium or aluminum) or is (also) of a fiber-reinforced composite material, e.g. a foam filed carbon fiber reinforced sandwich element. The second object has a second opening 12 that in the depicted configuration is a blind opening. The blind opening forms an undercut 13 by having a distal broadening. Due to the distal broadening, a shoulder 14 is formed.

In the depicted configuration, there is also an optional separating/insulating layer 8 that is of a thermoplastic material. More in particular, the separating layer 8 may be of the same thermoplastic material as the thermoplastic material of the composite, or may be of a different material, wherein such different material may optionally be nevertheless weldable to the thermoplastic material of the connector.

The connector 3 is essentially pin-shaped with a proximal head 31, a shaft portion 32 and a guiding opening 33 open towards the proximal side. The connector is composed of a, for example, metallic core 5 and a thermoplastic material 4 arranged at least at the distal end and surrounding the core 5 laterally.

The sonotrode 6 has a distal end face adapted to the shape or desired shape of the connector's proximal end face, more particularly to the proximal end face of the head 33. It has a guiding protrusion (pin) 61 corresponding to the guiding opening 33 of the connector. The guiding protrusion 61 and the guiding opening 33 may be dimensioned so that they cause a friction fit between the sonotrode and the connector, i.e. the connector 3 may be plugged on the sonotrode 6. In contrast to the—schematically—depicted configuration, the guiding opening may optionally be deeper than the length of the guiding protrusion 61 to allow for some distance between the guiding protrusion 61 and the core 5, especially if the thermoplastic material of the head portion is to be deformed during the process also.

FIG. 1a also illustrates an axis 20, corresponding to an axis of the openings, often perpendicular to the surface planes of the first and second object. In the configuration of FIG. 1a, as well as in subsequently described configurations (unless stated otherwise) the openings as well as the connector and possibly also the sonotrode may be symmetrical about rotations around the axis. This, however, is not necessarily the case. Rather, the methods described in this text are also suited for configurations that do not have this rotational symmetry about the axis.

After the process of positioning the connector in the openings 11, 12 and of using the sonotrode to press the connector 3 against the bottom face of the second opening 12 and at the same time coupling energy into the connector, thermoplastic material 4 of the connector will have been caused to flow sideways and especially to fill, at least in part, the undercut 13 of the second opening to form a foot portion 41. As a result, the connector is secured against being pushed out after re-solidification of the thermoplastic material. At the same time, the thermoplastic material 4 has been welded to the separating layer 8 (if applicable). The dashed circles 21 in FIG. 1b designate the region in which the welding has taken place.

The amount of the thermoplastic material initially arranged at the distal end of the connector may be adapted to the volume of the second opening so that the latter may be entirely filled. Thus, in contrast to the schematically depicted connector 3 in FIG. 1a, the distal end may include thermoplastic material that is longer, i.e. extends further in the axial direction.

The resulting configuration is shown in FIG. 1b. The core 5 is placed such that it at least traverses the shear plane between the first object 1 and the second object. In the configuration of FIGS. 1a and 1b, where there is a separating layer 8 between the first and second objects, this implies that the core traverses the volume of the separating layer and traverses both, the plane defined by the surface of the first object facing towards the second object and the plane defined by surface of the second object facing towards the first object.

The embodiment of FIGS. 2a and 2b is distinct from the embodiment of FIGS. 1a and 1b in that the diameter of the second opening 12 is smaller than the diameter of the first opening 11. Also, especially in order to deal with this, the connector 3 has a distally facing shoulder 35. This shoulder has the additional effect of enhancing the weld between the thermoplastic material 4 of the connector and a possible separating layer 8. Of course, it is however also possible to provide the first and second openings with the same diameters.

The separating layer 8 in all embodiments that provide such layer need not have a through opening. Rather, the separating layer during the process may be locally liquefied and thus perforated by the connector during the process.

Figure 3B:
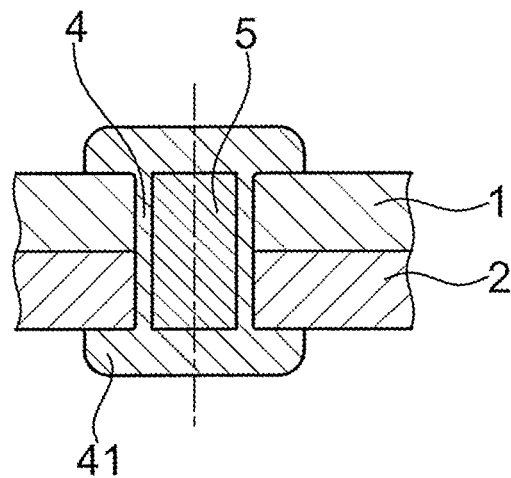
FIG. 3b the arrangement of FIG. 3a after the process.

FIGS. 3a and 3b depict an embodiment that is distinct from the embodiment shown in the previous figures by the following features:

The second object 2 is, in the region where it is to be connected to the first object, flat, especially board or sheet shaped. The second opening 12 is a through opening. A counter element 7 is provided during the process of coupling vibrations into the connector 2, by which a counter force to the mechanical pressing force applied by the sonotrode (not shown in FIG. 3a) is exerted on the connector. The counter element 7 forms a mould portion 71 that forms a cavity when an abutment surface portion 72 is held against the distal surface of the second object. The mould portion has a shape a replica of which corresponds to the desired shape of the foot portion 41 (FIG. 3b).

There is no separating layer between the first and second objects 1, 2. Rather, the objects lie directly against each other.

In the depicted configuration, the outwardly facing surfaces of both the head portion and the foot portion are flat, and the sonotrode does not have any guiding protrusion.

The diameters of the aligned first and second openings are equal.

All of these three features are independent of each other and can be realized individually or in any combination. For example, in the embodiments with blind second openings, the separating layer is optional and can be left away, whereas it is possible to provide a separating layer of the kind shown in the previous figures also in embodiments with the second opening being a through opening. Also, it would be possible to add guiding or directing features to the sonotrode surface and/or the mould portion 71 in the configuration of FIGS. 3a-3b without the separating layer, etc.

In all embodiments that include a counter element 7, the counter element may be provided, instead of a passive element held against the objects, as a further sonotrode that vibrates also during the process. Such sonotrode may have a mould portion with a shape of a replica also.

In all embodiments of the invention, an additional step of heating the thermoplastic material locally to a temperature above the glass transition temperature, especially before the vibrations are applied and/or during an initial step of applying the vibrations may be foreseen. This heating may according to a first option be done directly. For example, the distal end of the connector may be irradiated by laser radiation of a frequency that is well absorbed by the thermoplastic material 4 of the connector.

According to a second option, the heating may be done indirectly through heating a component that comes into contact with the thermoplastic material. For example, in a configuration like the one of FIG. 3a, the second object or both objects may be heated, locally along the openings or fully. In addition or as an alternative, the counter element 7 may be heated locally (along the mould portion) or fully. In this, heating may be carried out by any conventional method, including resistive heating, induction, irradiation etc.

Figure 4A:
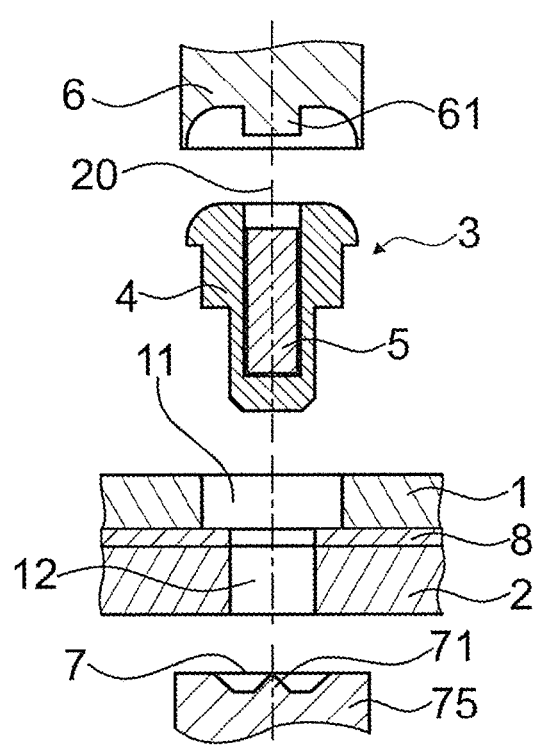
FIG. 4a an even further arrangement.
Figure 4B:
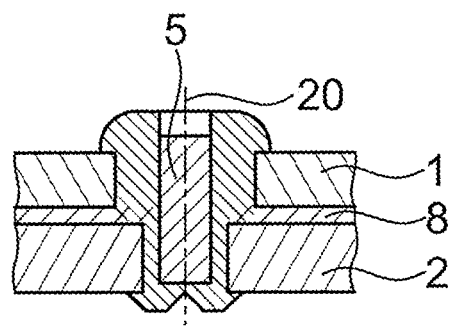
FIG. 4b the arrangement of FIG. 4a after the process.

FIGS. 4a and 4b yet show an other embodiment with the second opening 12 being a through opening. The connector 3 is shaped similarly to the connector shown in FIGS. 2a and 2b. Accordingly, the sonotrode 6 has a guiding protrusion 31.

Between the first and second objects, a separating layer 8, again for example of a thermoplastic material, is arranged.

The mould portion 71 has an energy directing and/or flow directing feature in the form of a central tip-shaped protrusion 75. Such feature may have the function of assisting the onset of the liquefaction process (energy directing function). Especially the feature is not tip-shaped but for example ridge-shaped it may additionally direct the flow of the liquefied material during the process.

Figure 5A:
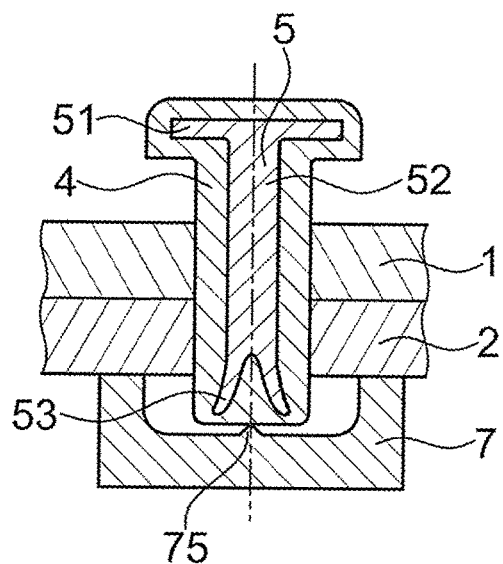
FIG. 5a elements of yet another arrangement.
Figure 5B:
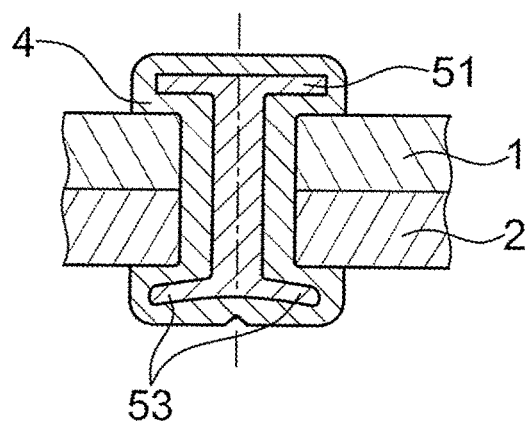
FIG. 5b the arrangement of FIG. 5a after the process.

The embodiment of FIGS. 5a and 5b especially differ in the design of the core 5 that in this case may especially be of a ductile metal, such as steel.

Firstly, the core 5 has a proximal broadening (or head feature) 51 that gives additional stability against forces in axial directions. A cross section of the proximal broadening may be, at least in some radial directions, larger than the cross section of the first opening so that in a projection along the axis the core overlaps at least with the first object.

Secondly, the core is provided with a plurality of distal tongues 53. In the initial state (FIG. 5a) the tongues may be oriented axially or project slightly radially outward as shown in FIG. 5a. These tongues are sufficiently ductile so that under the effect of the pressing force applied between the sonotrode (not shown in FIG. 5a) and the counter element 7 they are deformed to project more outwardly after the process, as illustrated in FIG. 5b. In this, the deformation of the core is similar to the deformation of a conventional tubular rivet where the end without the head (the "buck-tail") is deformed to expand. In contrast to conventional rivets, however, the outwardly deformed portions of the core 5 are (controlled by the shape of the counter element) not pressed against the surface of the second object 2 but remain at some distance thereto so that thermoplastic material shields the core 5 from the second object.

As an alternative to having a plurality of tongues 53, the core may also include a tube-shaped distal end similar to a tubular rivet, in which case the deformation force is somewhat larger.

In FIG. 5b, the tongues are illustrated to be covered by thermoplastic material on all sides after the process. However, this is not necessary. Rather, on the outer side, the core may be exposed.

The head feature and the distal end deformation approach may be realized each individually or in combination.

Figure 6A:
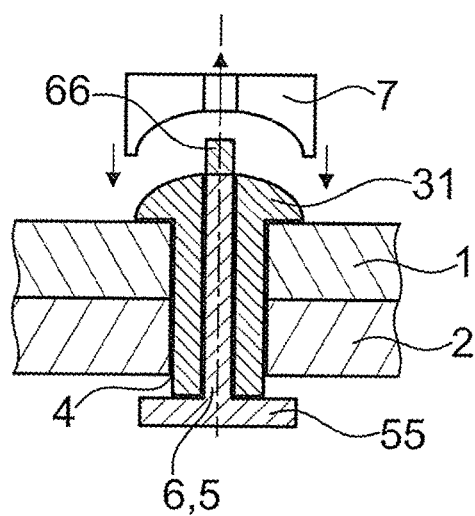
FIG. 6a elements yet a further arrangement.
Figure 6B:
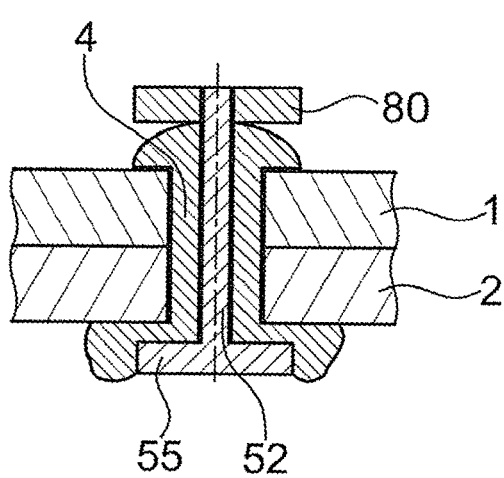
FIG. 6b the arrangement of FIG. 6a after the process.

In the embodiment of FIGS. 6a and 6b, the sonotrode 6 is shaped to reach through the openings so that the contact face between the sonotrode 6 and the thermoplastic material is at the distal face. Therefore, in this embodiment the mechanical vibrations are transmitted to the distal side not by the connector as in the previous embodiments but by the sonotrode itself. The force that causes the mechanical pressure is coupled into the sonotrode as tensile force, not as pushing force, and the contact face of the sonotrode is oriented proximally ("backward"). The counter element 7, in contrast is held against the connector from the proximal side (the side from which the site is accessed).

In this embodiment, the thermoplastic material 4 may be caused to liquefy at the interface between the sonotrode contact face and the thermoplastic material.

In the embodiment of FIGS. 6a and 6b, the sonotrode has a double function. It firstly serves for applying the mechanical vibrations to the thermoplastic material of the connector. Secondly, it serves as the core 5. The foot of the sonotrode that includes the backwardly facing coupling-out face also serves as foot feature 55 of the connector after the process.

For being coupled to the vibration source (not shown), the sonotrode may include a coupling feature 66 that optionally after the process of liquefying may be clipped off. Alternatively, such coupling feature may remain or be deformed and become part of the connector.

In FIG. 6b, an optional head clip 80 is shown that may be secured, for example, by a mechanical connection or by welding or by an adhesive bond to the shaft 52 of the core 5.

Figure 7:
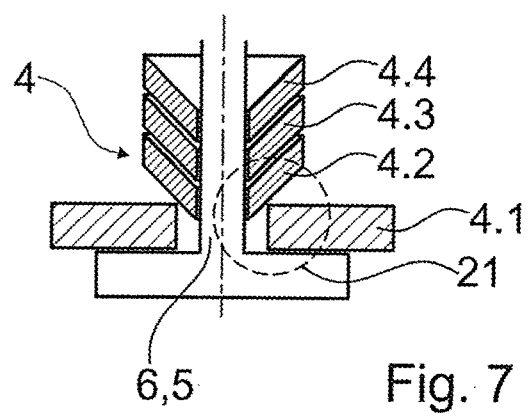
FIG. 7 a detail of yet another possibility.

FIG. 7 schematically illustrates the possibility that initially the core and the thermoplastic material need not be one-piece. Rather, the thermoplastic material may be provided as separate thermoplastic part. In addition or as an alternative, optionally, the thermoplastic material may be provided as a plurality of initially separate portions 4.1, 4.2, 4.3, 4.4. These portions may be welded together in the process. By way of example, the dashed line 21 illustrates one region where a weld is to arise.

While this possibility of separate thermoplastic material parts or portions in FIG. 7 is illustrated for a "backward" configuration, this possibility exists in general, and also for other configurations.

Figure 8A:
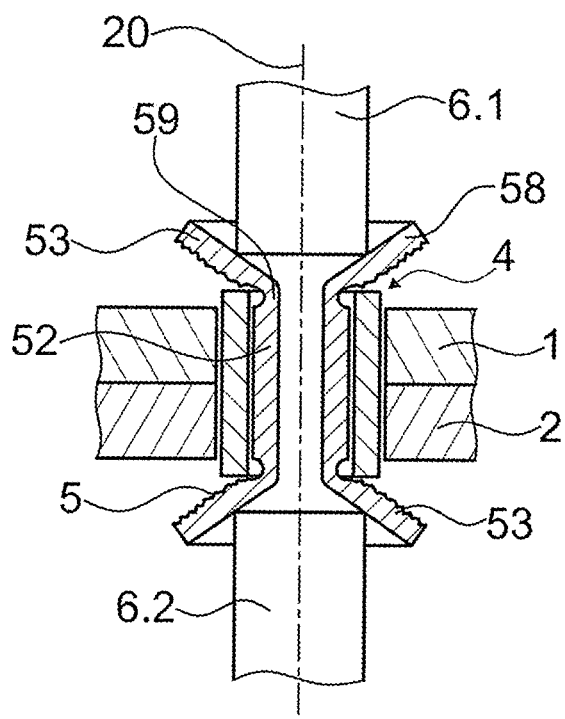
FIGS. 8a and 8b elements of an even further arrangement during and after the process.
Figure 8B:
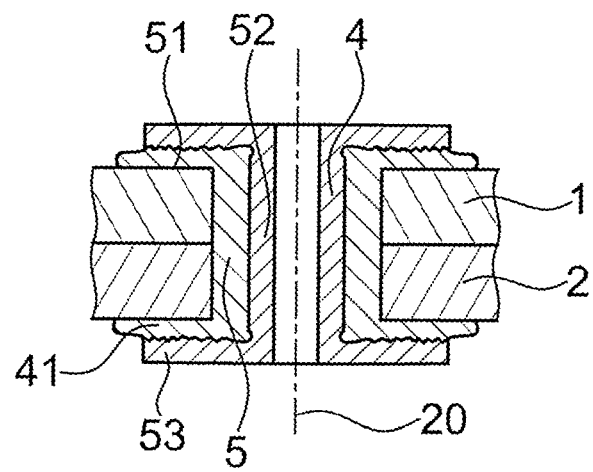

In the embodiment of FIGS. 8a and 8b, similarly to the embodiment of FIGS. 5a and 5b the distal end of the core 5 is deformable and, for example, includes a plurality of tongues 53. Similarly, also the proximal end of the core is deformable and has a plurality of tongues 53.

Between the shaft 52 and the tongues 53, there may be a constriction 59 serving as pre-determined deformation point. In the depicted embodiment the body 5 further has a roughening structure 58 for a more intimate connection to the thermoplastic material after the latter has flown.

The tongues 53 may initially be oriented parallel to the axis at least approximately so that the body fits through the first and second openings.

The thermoplastic material 4 is provided as a thermoplastic sleeve. The body 5 of the connector may initially be separate from its thermoplastic sleeve, or the sleeve may be attached to the body.

For the bonding process, a first sonotrode 6.1 and a second sonotrode 6.2 are used. In accordance with a first variant, the sonotrodes initially are pressed against each other thereby bending the tongues outwardly, as illustrated in FIG. 8a, without any vibrations being applied. Then, during the final stages of the bending and/or thereafter, the vibrations set in. The vibrations in this are applied to the thermoplastic material at least partially through the body, i.e. through the arms.

In accordance with a second variant, the vibrations may set in already initially. Then, the vibration will cause some heating of the material of the body that will serve to pre-heat the thermoplastic material 4 locally where it is to be liquefied, in accordance with the above-described optional concept.

FIG. 8b illustrates the configuration after the process.

While referring to FIGS. 8a and 8b the concept of using a sonotrode (for example in direct contact with the body) to deform the body, with or without pre-heating by vibrations, has been described referring to an embodiment of the category that includes two sonotrodes applying the vibrations on both sides, this need not be the case. Rather, the concept can also be used for using one sonotrode only, in combination with a counter element on the other side. In this, the counter element may merely be held against the connector, or may itself be used to deform the body locally.

The embodiment of FIGS. 8a and 8b is also an example of an embodiment where the connector in its final state has an axial through opening. This may be the case for reasons that lie in the process (for example easier deformation) and/or may be desired because the axial opening has a certain function, such as allowing an exchange of air and humidity or similar and/or minimizing weight.

Hereinafter, briefly the possibility of providing the openings and the connector in a not rotationally symmetrical shape is discussed. By this, the connection is further secured against rotational movements.

Figure 9:
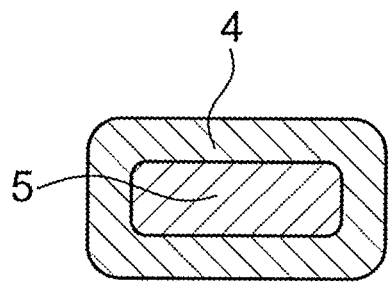
FIGS. 9 and 10 cross sections of shaft portions.
Figure 10:
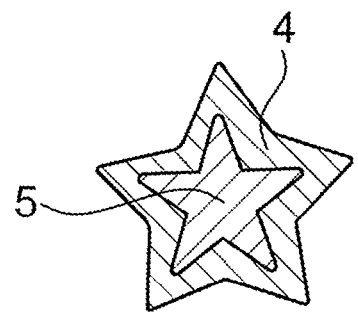

FIG. 9 illustrates a cross section (in the region of the shaft) of a connector flattish shape, whereas the connector of FIG. 10 has a star shape (for example similar to a "torx" profile).

Figure 11:
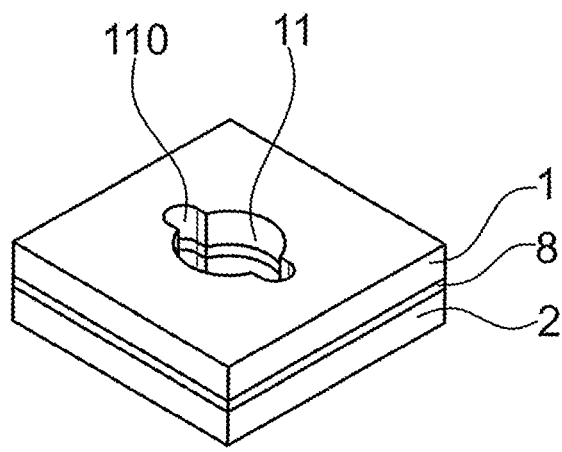
FIGS. 11 and 12 shapes of different openings.

FIG. 11 depicts an arrangement in which the first opening 11 is generally cylindrical but has radially outwardly projecting lobes 110. The shaft portion of the connector and the second opening will have an approximately same cross section. It would however also be possible to provide only the distal end of the connector with a corresponding cross section and to subject the connector to a twist movement—for example of 90° in the configuration of FIG. 11—for an additional securing against axial forces.

Figure 12:
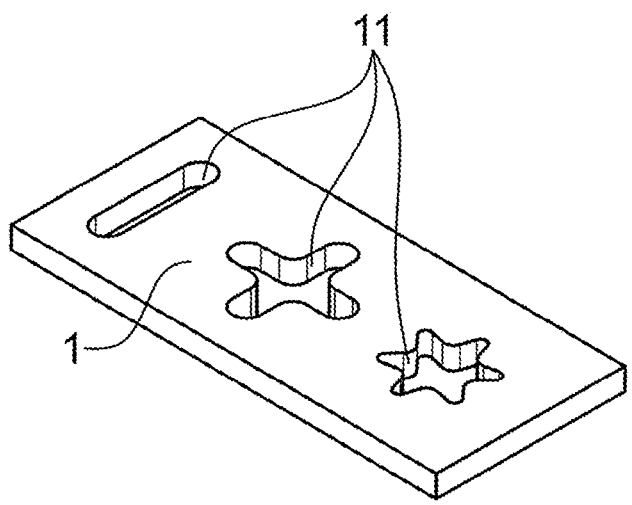

FIG. 12 shows further shapes of openings 11, namely a flattish shape with rounded corners, a four-lobe shape and a generally circular but undulated shape (that may be viewed as multi-lobe shape), respectively.

Figure 13:
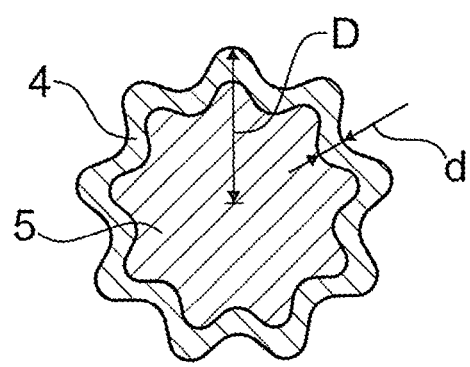
FIG. 13 a further cross section of a shaft portion.

As illustrated with respect to FIG. 13 (for the example of a generally circular but undulated shape) the relative dimensions of a hard core 5 and the thermoplastic material 4 covering the periphery of the core have an influence on the rotational stability. In some embodiments, the characteristic dimension (thickness d) of the thermoplastic material may be chosen to satisfy $0.5<d/D<0.1$, especially, $0.1<d/D<0.3$, with D being a characteristic radial dimension of the core, here the radius of its cross section. While FIG. 13 illustrates this feature for a particular cross sectional shape of the connector, this teaching may apply to other shapes equally well. In a group of embodiments, the dimensions may in addition or as an alternative be chosen so that outer radial protrusions of the core 5 overlap in their radial positions with the inner protrusions of the opening, so that the core 5 could even then not rotate freely if there was hypothetically no thermoplastic material. In configurations like the one of FIG. 13 this implies that an amplitude of the undulations (or generally a characteristic radial extension of protruding features of the core) is larger than the thickness d of the thermoplastic material. This provides a maximal securing against rotational degrees of freedom.

In the previously described embodiments (with the exception of one variant of FIG. 8a), the head portion of the connector has been assumed to be present initially, i.e., prior to the step of causing thermoplastic material to liquefy. However, it is also possible to deform both the distal end and the proximal end by the mechanical vibration, into the foot portion and the head portion, respectively.

Generally, whether the mechanical vibrations cause liquefaction at the interface between the sonotrode and the thermoplastic material or whether the mechanical vibrations will be coupled into the connector and transmitted to an other interface of the connector will depend, among other factors, on the pressure at the sonotrode/thermoplastic material interface and on the vibration frequency. Generally, with high pressures and lower vibrations frequencies the vibrations will have a tendency to be transmitted into the connector and to the far end, whereas at higher frequencies and at a lower pressures, the liquefaction will have a tendency to set in at the sonotrode/thermoplastic material interface.

Figure 14:
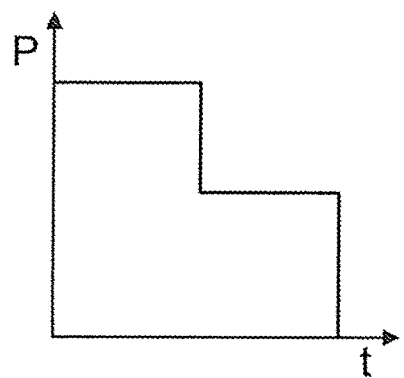
FIG. 14 a pressure-time diagram.

For forming both, the foot portion and the head portion in the process, according to an option a targeted pressure profile may be used. An example is very schematically illustrated in FIG. 14 showing the pressure p as a function of the elapsed time. In a first phase, the pressure is relatively high so that no liquefaction will take place at the interface to the sonotrode but liquefaction will predominantly take place starting at the remote (distal in the "forward" set-ups like in FIG. 1-5) end. After the forming of the foot portion, the pressure may be dropped to a second value, so that in a second phase the thermoplastic material is liquefied at the interface to the sonotrode, and a head is formed.

In addition or as an alternative, also the frequency could in principle be adjusted during the process, for example from a lower frequency during the first phase to a higher frequency during the second phase. To do so, for example the sonotrode may be excited to vibrate at a harmonics, or the eigenfrequency (resonance frequency) of the sonotrode may be appropriately influenced, for example by impeding or influencing vibrations of the sonotrode at a pre-determined location along its length. Alternatively, the sonotrode may be exchanged between the first and second phases.

As yet another alternative, especially if all thermoplastic material of the connector may liquefy during the process, instead of applying a particular profile the operator may apply process parameters that cause an onset of liquefaction at the remote end and just wait until liquefaction progresses to the close end.

Figure 15:
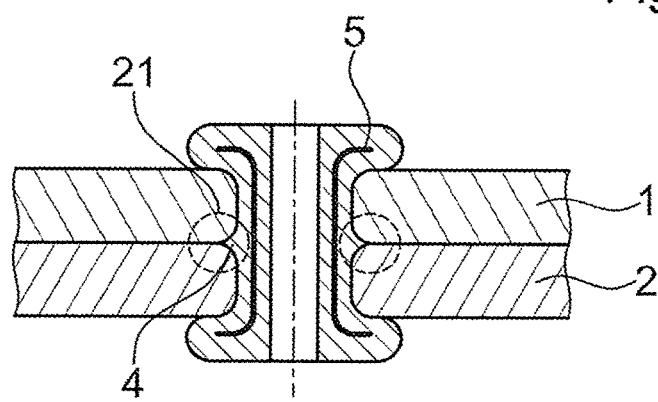
FIG. 15 the sealing effect.

As previously discussed, the process parameters may be chosen so that the thermoplastic material gets into intimate contact with the circumferential walls of the openings in the first and second objects and thereby seals the openings. This is illustrated in FIG. 15. The thermoplastic material 4 penetrates into irregularities or gaps between the first and second objects 1, 2 as illustrated in the regions of the dashed circles 21 in FIG. 15.

In the embodiment of FIG. 15, the body 5 of the not thermoplastic, for example metallic, material is assumed to have the shape of a relatively thin sheath that is covered by thermoplastic material also in its interior. The distal and proximal ends of the core (the distal end may be slitted into a plurality of tongues to be more easily deformable) are bent outwardly for additional mechanical stability of the connection.

Figures 16A, 16B:
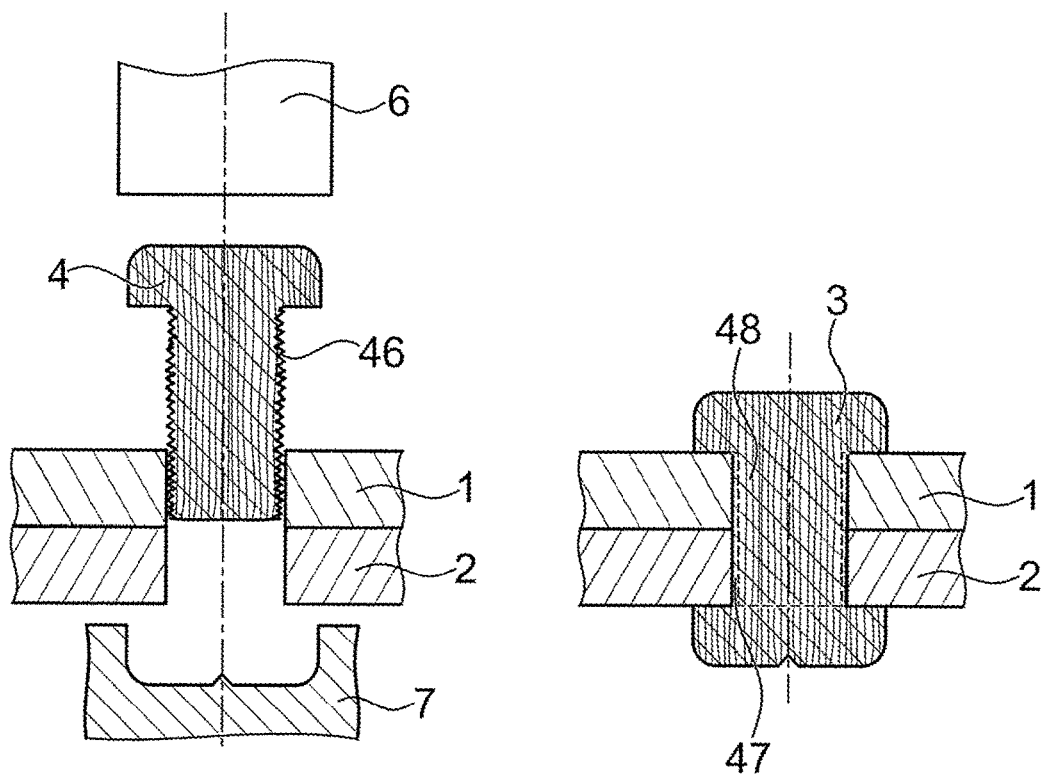

In the hereinbefore described embodiments, the core was assumed to be of a material that is clearly distinct from the thermoplastic material, for example of a metal, with a clearly defined interface between the core and the thermoplastic material. The core in these embodiments defines the non-flowing zone or at least forms part of it. In FIGS. 16a and 16b an embodiment that does not have such a core is shown. The connector 3 is of a fiber reinforced material, here with continuous fibers oriented approximately along the axial direction. Around the periphery that is to come into contact with the circumferential walls of the openings in the first and second objects the connector includes energy directors 46. Energy directors are known from the field of ultrasonic welding. They can have the shape of ridges or humps or similar. Especially, and in contrast to the illustration, the energy directors may be axially running ribs.

The energy directors—or other measures—may cause liquefaction of the thermoplastic material also (in addition to the distal end in contact with the counter element 7) around the periphery, while a central (with respect to radial directions) region remains solid. FIG. 16b illustrates the split into a flowing zone 47 distally and circumferentially and a non-flowing zone 48 proximally and centrally, separated by the thick dashed line. This provision of a non-flowing zone 48 in such a configuration may especially be advantageous to conserve the orientation of the fibers in the connector.

In the configuration of FIGS. 17a and 17b, in contrast to the previously described embodiments, the connector has a pre-shaped foot portion 41 and is inserted, into the aligned first and second openings, from the distal side. In the depicted embodiment, the foot portion includes a distal broadening 57 (flange) of the core 5.

The sonotrode 6 head portion is then used to shape the head portion 31. It is pressed against the thermoplastic material 4 of the proximal end of the connector, while some suitable counter element 7 is used to exert a counter force. The vibration source operating parameters and the pressure by which the sonotrode 6 is pressed against the connector are chosen so that a substantial mechanical energy is absorbed at the interface between the sonotrode and the connector so that the liquefaction sets in at that interface. The shape of the distal coupling-out face of the sonotrode then is chosen to form the head by being, at least in part, a negative replica of the head shape.

Figure 18C:
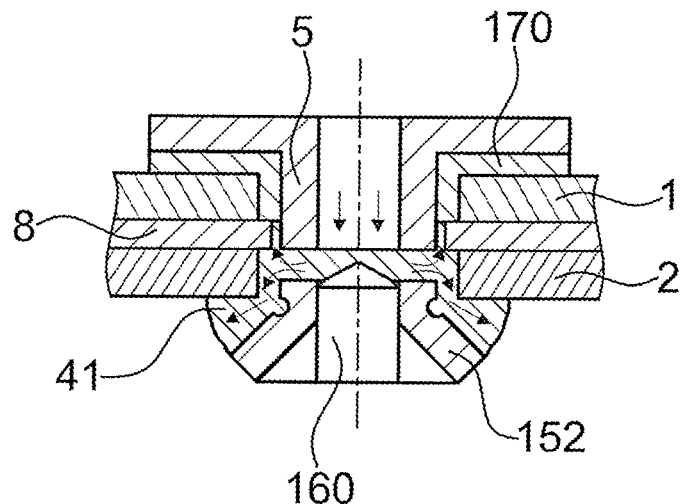

FIGS. 18a-18c yet show a further embodiment. In this embodiment, the body 5 of the not thermoplastic material is not a core embedded in the thermoplastic material. Rather, the body 5 is a sheath element with an axially oriented opening open to the proximal side and with a proximal broadening (flange) 51 that constitutes, at the end of the process, a head feature of the body. The sheath element has a plurality of exit openings 151. Towards the distal end, the body 5 further includes a plurality of arms 152 in one-piece with the rest of the body and connected thereto by pre-determined weak points 153. Distally, the arms 152 are connected by an elastic leaf 154 that is bowed into the interior of the cannulated body.

A spreading element 160 is shaped to be insertable from the proximal side into the axial opening of the body. When such a spreading element 160 is pressed, by an appropriate tool 161, distally against the bow formed by the elastic leaf 154, the same will be pressed flat and thereby the arms 152 will be folded outwardly (FIG. 18b). The spreading element 160 has a diameter adapted to the inner diameter of the axial opening so that the same is closed off to the distal side by the spreading element when the same has been moved until is in the position shown in FIG. 18, where it, for example, meets a distal stop (for example a small shoulder, not shown in FIG. 18b). In this position, at least radially outermost portions of the proximally-facing face of the spreading element 160 are distally of the exit openings 151. The spreading element further has a proximally facing tip or ridge 161.

In this, the thermoplastic material 4 is provided, for example, as a pin-shaped element insertable from proximally into the axial opening. Under the influence of the mechanical vibrations and pressure, the thermoplastic material will liquefy at the interface to the spreading element 160 and be pressed out of the exit openings 151.

For the process, the body 5 is introduced into the aligned first and second openings of the objects 1, 2 while the arms 152 are in their initial, not spread state. Then the spreading element is introduced to spread the arms 152 as described, whereafter the thermoplastic element is introduced and a sonotrode that has for example a distal end capable of being inserted into the opening is used to couple vibrations into the thermoplastic element 4 while the same is pressed towards the distal side so as to liquefy the thermoplastic material and press it out of the exit openings. The resulting configuration is shown in FIG. 18c: A foot portion 41 fills the gap between the arms 152 and that surface of the second object which faces away from the first object.

In the configuration of FIG. 18c, the connector, in addition to the body 5 and the thermoplastic element 4, also includes a sleeve element 170 of an electrically insulating material protecting those portions of the body that would otherwise be in contact with the first object, namely the circumferential surface of the shaft portion and the distal surface of the proximal broadening 51. The electrically insulating material of the sleeve element may, for example, be also a thermoplastic material, capable of being welded to the thermoplastic material of the thermoplastic element and/or to the thermoplastic material of the separating layer 8 (if present). Alternatively, it may be of an other suitable material.

In an even further embodiment, the body may be made of a same material as the first object 1. Then, direct contact between the body 5 and the first object 1 is possible, and the sleeve element may be omitted (the body 5 and the first opening will be accordingly dimensioned).

In even further variants of the embodiment of FIG. 18c, it is important also surface portions of the second object may be shielded from the body 5 by the sleeve element 70, or portions of the first object may be shielded from the body 5 by liquefied and re-solidified thermoplastic material of the thermoplastic element 4. In other words, it is not crucial that the sleeve element reaches to the interface between the first and second objects.

Figure 19:
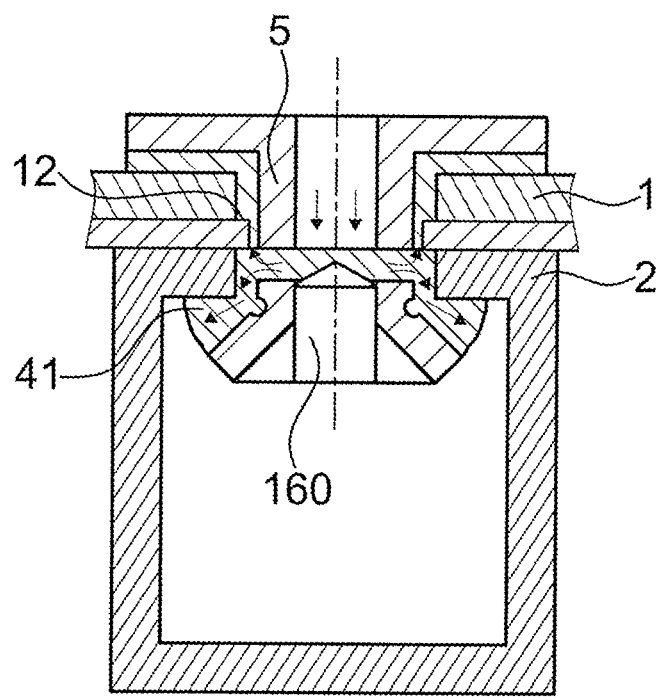
FIG. 19 a possible application of the embodiment of FIGS. 18a-18c.

FIG. 19 yet shows a variant of the embodiment of FIG. 18c in which the second object 2 is not flattish and sheet-like bot a hollow bar. The second opening 12 in this configuration is nevertheless a through opening, because the portion of the second object 2 to which the first object is to be connected is flattish.

The approach taught with respect to FIGS. 18a-18c and 19 would however also apply to second objects for which the second opening is not a through opening but a blind opening.

The embodiment of FIGS. 20a and 20b differs from the embodiments of FIGS. 3a-4b by the following features:

The metallic core 5 has on its outer surface, especially on its lateral (with respect to the proximodistal axis) surface a plurality of locking features 81 in the form of indentations. In addition to indentations or as an alternative thereto, the surface could also include other features suitable of causing a form locking between the core and the thermoplastic material around it, for example protrusions, an open porosity, or similar. These form locking features 81 may initially be embedded in the thermoplastic material 4 (in the depicted example by the indentations being filled with thermoplastic material) or they can be filled only during the process by the temporarily liquefied thermoplastic material. The form locking features stabilize the core 5 within the thermoplastic material and hold it in place.

In embodiments, the indentations or ridges run into circumferential directions so as to assist the stabilization with respect to axial forces. This may especially be advantageous if after the process the core is accessible from the proximal or distal side for fastening some other item thereto.

The metallic core has a distal guiding indentation 82. The guiding indentation is an example of a guiding feature and works to define, together with the central guiding protrusion 75 of the mould portion 71 in the counter element 7 the insert's position during the process when the thermoplastic material around it is at least partially liquid. Note that this works both, in situations where the guiding protrusion of the mould portion of the counter element (or, in other embodiments, of the sonotrode), directly cooperates with the guiding feature, and in situation where there is no direct contact between the guiding indentation and the guiding protrusion.

The thermoplastic material 4 at the distal end face has a liquefaction directing feature 87, namely an indentation cooperating with the guiding protrusion 75 to initially define the relative position and during the process assists the guidance of the material flow.

The thermoplastic material 4 has a proximally facing step feature 85 that initially serves as interface for the coupling-out face of the sonotrode 6 at the distal end thereof. Material liquefied at this interface will flow into a gap remaining of the guiding opening 33 between the sonotrode's distal end face and the proximal end face of the core 5 so that after the process the core is fully embedded in the thermoplastic material.

Alternatively, depending on the manufacturing process of the connector 3, the metallic core may be embedded in the thermoplastic material already at the beginning of the process. Then, optionally, the space between the guiding protrusion of the sonotrode and the core 5 may filled from the beginning of the process.

As an even further alternative, a configuration like in FIG. 4a/FIG. 4b may be chosen where the proximal end of the core 5 remains accessible after the process, for example to form a nut/thread element.

The axial extension (length) of the core 5 approximately corresponds to the cumulated thickness of the first and second objects, and at the end of the process, the proximal end is approximately aligned with the upper surface of the first object, and the distal end is approximately aligned with the lower surface of the second object.

More in general, the process parameters are in most embodiments chosen such that the metallic core traverses the shear plane between the first and second objects, independent of its axial extension.

All of these features can be implemented independent of each other, and in combination with features of embodiments described hereinbefore. Especially, they are also suited for connectors with non-round cross sections, or for connectors with configurations as taught referring to FIG. 1-10, or 17a/17b.

Figure 20:
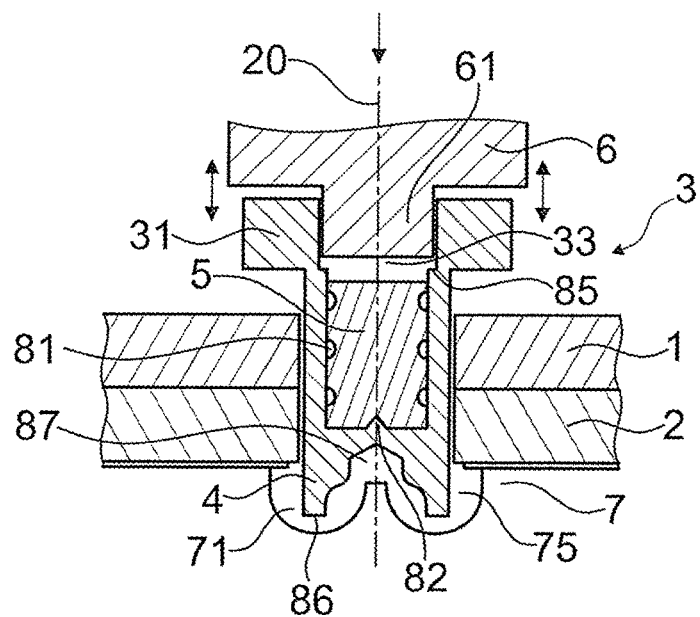
FIG. 20 a further arrangement for carrying out the connecting process according to the invention.
Figure 21:
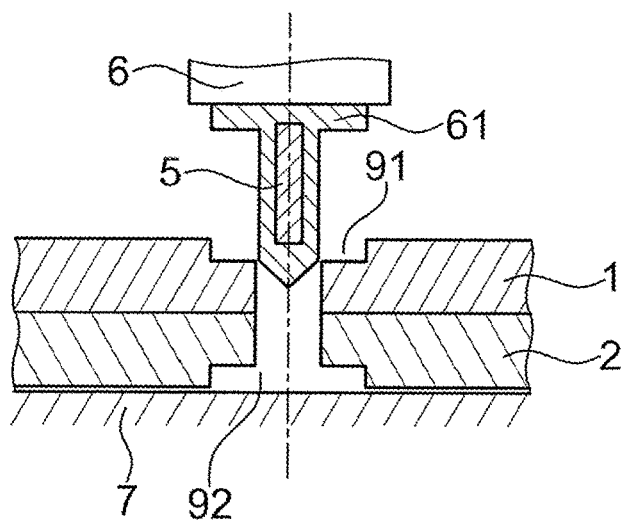
FIG. 21 yet another arrangement for carrying out the process according to the invention.

The embodiment of FIG. 21 is distinct from the previously described embodiments, for example of FIGS. 3a/3b or of FIG. 20, in that the proximal end face of the first object 1 has a first indentation 91, and the distal end face of the second object 2 has a second indentation 92. The head 31 of the connector is adapted in its shape to the first indentation 91. The counter element 7 instead of having a mould portion is essentially flat (possibly with a energy directing protrusion (not shown in the Figure)), so that the foot portion formed in the process fills the second protrusion. The embodiment FIG. 21 is thus an example where the connector at the end of the process has head and foot portions that are flush with the outer surfaces.

Figure 22:
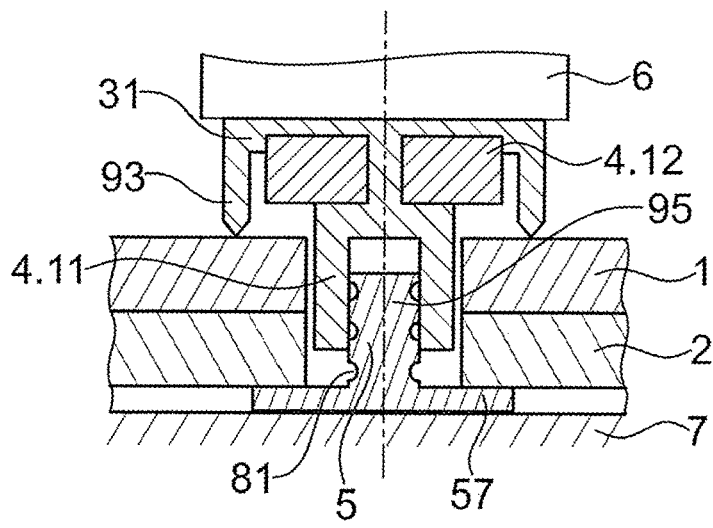
FIG. 22 an arrangement with a connector having two different thermoplastic materials.

FIG. 22 yet shows an embodiment in which the connector has a first thermoplastic material portion 4.11 (of a first thermoplastic material) and a second thermoplastic material portion 4.12 of a different, second thermoplastic material. The first and second thermoplastic materials may have different liquefaction properties and/or different mechanical properties. For example, the second thermoplastic material may have a glass transition temperature substantially below the glass transition temperature of the first thermoplastic material.

Also, the head of the connector forms circumferential distally facing flange 93 with an energy directing distal edge.

In the embodiment of FIG. 22, the thermoplastic part, i.e. the part that includes the first and second thermoplastic materials, is screwed onto (and/or otherwise secured to, for example in a positive-fit like manner at least after the liquefaction and re-solidification of the first thermoplastic material, see the illustrated locking features 81) the non-liquefiable body 5, which non-liquefiable body is metallic and forms the foot 57.

When the sonotrode 6 is pressed against the connector with the connector placed relative to the first and second objects, as depicted in FIG. 22, liquefaction firstly sets in at the interface between the flange 93 and the first object 1 and, depending on an extension of the first thermoplastic material at the shaft region, possibly also at the distal end of the thermoplastic part. Material liquefied at the flange 93 may, depending on the composition and structure of the first object material, also penetrate into structures at the surface of the first object and thereby form, after re-solidification, an additional positive-fit connection, for example of the kind described in WO 00/79137.

Some time after the beginning of the process, due to the forward movement of the thermoplastic part the second thermoplastic material portion 4.12 gets into contact with the object surface. Because of its reduced glass transition temperature, thereafter the second thermoplastic material portion 4.12 will liquefy predominantly and, due to the hydrostatic pressure generated by the connector being pressed against the objects and the counter element 7, flow into any remaining cavities. Because of the flange 93, however, the second thermoplastic material 4.12 will be prevented from flowing laterally further than the flange 93. Because it will thus fill any remaining gap between the connector and the objects, both, along the circumferential hole walls, and proximally and/or distally of the objects, it will provide an efficient sealing.

By this approach, it becomes possible to provide an effective seal. More in general, because for the second thermoplastic material 4.12 a material that does not need to have the mechanical properties required for the first thermoplastic material can be chosen, its material properties can be optimized for any other purpose, depending on the application. In examples, the second thermoplastic material can, for example, be chosen to have a glass transition temperature well below freezing point so that it maintains elastic properties even at low temperatures. In addition or as an alternative, the second thermoplastic material can be chosen to be viscoelastic.

Figure 23:
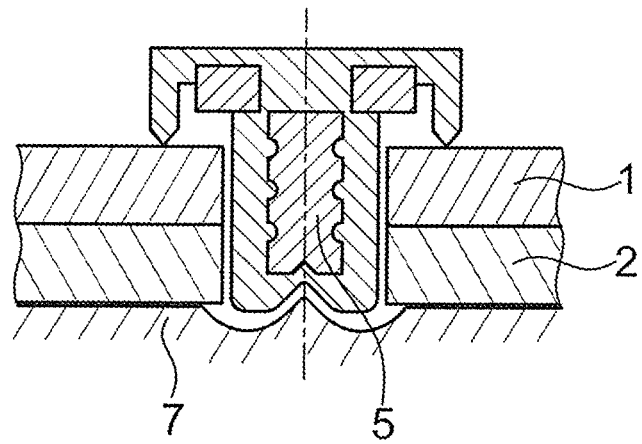
FIG. 23 a variant of the arrangement of FIG. 22.

The embodiment of FIG. 23 has, like the one of FIG. 22, first and second thermoplastic material portions 4.11, 41.2. In contrast to the embodiment of FIG. 22, the connector does not have a pre-formed metallic foot but is similar to the connectors of FIGS. 1-4 and 20, for example, additionally with the flange 93 and the second the thermoplastic material portion 4.12 for an additional sealing effect.

Figure 24:
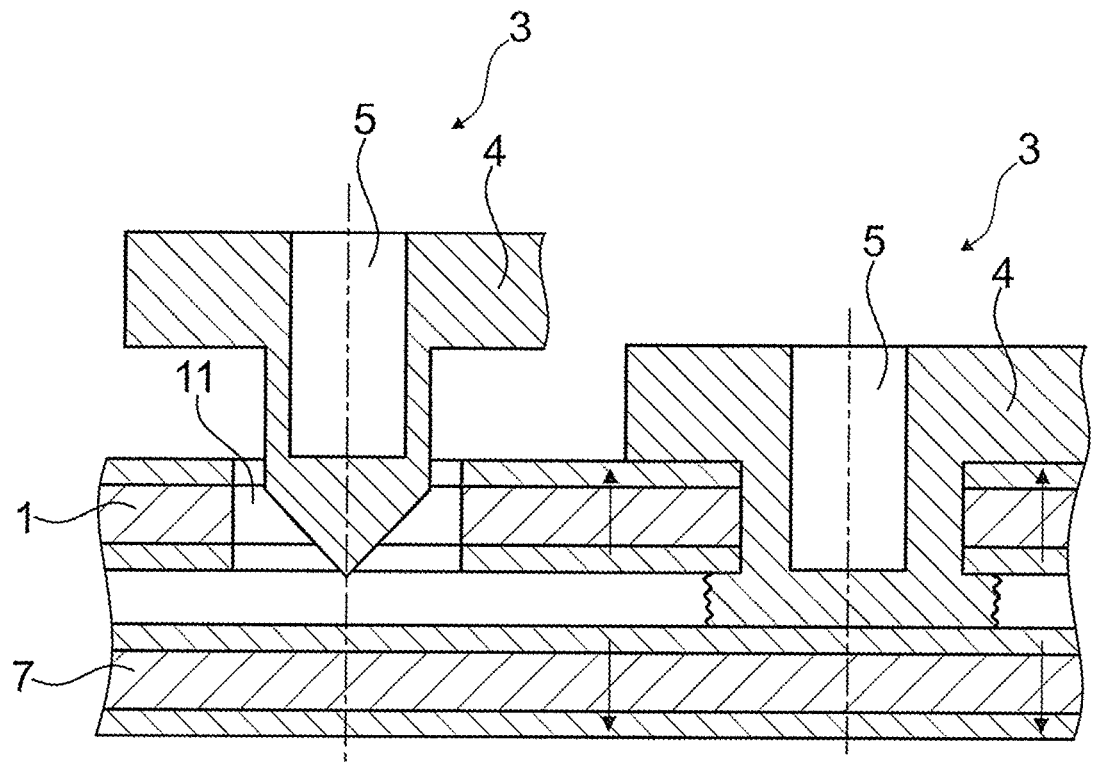
FIG. 24 two steps in a process according to the invention.

The embodiment of FIG. 24 is an example of a method of fastening a connector with a metallic core 5 of the kind described hereinbefore (for example referring to FIGS. 1-4, 20, 21 to a first object 1, which first object has a through opening 11, but without a second object being secured thereto by the connector. More in concrete, FIG. 24 illustrates fastening a connector to a double sheet layer, with each sheet here being illustrated as a having a sandwich structure. The first sheet herein is the first object 1, and the second sheet serves as the counter element 7. Between the sheets, i.e. the first object 1 and the counter element 7, a layer of a further softer and/or liquefiable material may optionally be arranged (not shown). In FIG. 24, the connector 3 shown on the left is illustrated (without the sonotrode) at the beginning of the process, whereas the connector 3 on the right is shown after the process. The block arrows illustrated that the process acts for pressing the sheets 1, 7 apart from each other.

FIG. 25 shows an example of a connector with two connector shaft and foot portions 3.1, 3.2. In the depicted embodiment, the connector does not have a metallic (or otherwise non-liquefiable) core, but the concept of a multiple foot connector illustrated in FIG. 25 could be implemented with shaft and foot portions with one or more non-liquefiable bodies also. The process of forming the foots for the multiple connector can be made in any way described hereinbefore, including causing the mechanical vibration energy to impinge from the proximal side while providing a counter element with a mould portion on the distal side (or alternatively similar to FIG. 21 providing a flat counter element together with an indentation in the object 1), or by causing the vibration energy to impinge from the distal side.

Also, while FIG. 25 illustrates the connector anchored in a single, first object 1, a multiple foot connector can equally well be used to secure a first object to a second object as described referring to most embodiments hereinbefore.

The same holds true for the embodiment described referring to FIGS. 26a and 26b. In this embodiment, the non-liquefiable body 5 is configured to also serve as the sonotrode during the process. To this end, the non-liquefiable body has an inner thread 114 and can be screwed to an outer thread 111 of a vibrating rod 110 that is connected to a vibration source (not shown). Also, the non-liquefiable body has a proximally facing ramp surface portion 112 that forms an interface with a corresponding distally facing coupling-in surface portion of the thermoplastic material 4. For the process, the non-liquefiable body 5 is pulled by the vibrating rod 110 while a counter element (hold-down device 112) is used to keep the thermoplastic material 4 in place so that the thermoplastic material is compressed between the non-liquefiable body and the counter element. As a result, the thermoplastic material is liquefied starting at the interface to the ramp surface portion 112 and flows sideways to anchor the device. The non-liquefiable body may be provided with additional outer circumferential and/or locking axial structures (not shown) to yield a stronger form locking to the thermoplastic material.

FIG. 26b shows the anchored device. The inner thread may serve for connecting a further part to the first object 1.

The embodiment of FIGS. 27a and 27b is similar to the one of FIGS. 26a and 26b, with the difference that the non-liquefiable body has an outer thread 115 cooperating with a corresponding inner thread of the vibrating rod. This embodiment can be made more compact compared to the one of FIGS. 26a and 26b because the non-liquefiable body can as a whole be pin-shaped instead of being nut-like.

In the embodiment of FIG. 28, the second thermoplastic material portion 4.2 is, for example, an elastomer, is arranged centrally with respect to radial directions, and embeds an electrical cable 121. In this embodiment, the connector serves for connecting the first object to the cable and to seal the lead through the first object 1.

The embodiment of FIG. 29 is an example of an embodiment where body 5 of the not liquefiable material does not only form a core but has a head feature 51. Also, in the embodiment of FIG. 29, the body 5 and the thermoplastic material 4 are initially separate. The body addition has a central bore 136 and a plurality of laterally located axial channels 133 for corresponding axial protrusions 131; 132 of the thermoplastic material 4 part to reach into. The channels 133 open out into lateral (exit) openings through which the liquefied thermoplastic material can flow out as indicated by the arrows 135 when the thermoplastic material part is pressed against the core while mechanical vibrations act on it. Flown-out portions of the thermoplastic material fill gaps between the body 5 and the lateral walls of the first object 1 and also flow sideways underneath the lower surface of the first object 1 to form a foot portion of the described manner. In addition the lateral wall of the central bore 136 may be provided with a structure, such as an inner thread, at least one circumferentially running ridge, an arrangement of dents, porosity, etc., into which thermoplastic material of the thermoplastic part may flow to additionally lock the thermoplastic material to the non-liquefiable body 5.

As in all other embodiments, the non-liquefiable body may be metallic, such as of steel or of a material on aluminum base, or of ceramics, of a (reinforced or not reinforced) hard plastic, or even of wood etc.

The embodiment of FIG. 29 may, like all other embodiments illustrated with one object 1 to which the connector is attached, also be used for securing a first and second object with respect to one another.

The embodiment of FIGS. 30*a* and 30*b*, finally, shows an embodiment with a non-liquefiable body 5 serving as a core, which body 5 is similar to the one described referring to FIG. 20. In contrast to the previously described embodiments, however, not only one sonotrode, but two sonotrodes 6.1, 6.2 are used for causing the thermoplastic material to flow sideways. More in concrete, the set-up includes a first sonotrode 6.1 arranged on a distal side of the connector for causing the formation of a head portion 31, and a second sonotrode 6.2 for causing a foot portion 41 to be formed (FIG. 30*b*). To this end, the sonotrodes are provided with appropriate mould features at their respective coupling-out end surfaces.

As described referring to FIG. 20, the non-liquefiable body 5 not only provides stability with respect to forces acting on the connection between the first and second objects 1, 2 but also by its shape and orientation, guides the flow of the liquefied material and stabilizes the arrangement during the head and foot forming process.

What is claimed is:

1. A method of bonding a connector to a first object, comprising the steps of:
   providing the first object with a first opening, the first opening being a through opening;
   providing a connector comprising a thermoplastic material and a core element of a material that is not liquefiable or liquefiable only at substantially higher temperatures than the thermoplastic material;
   arranging the first object and the connector relative to one another so that the connector reaches from a proximal side through the first opening;
   using a source of mechanical vibrations to generate vibrations, and applying the vibrations and mechanical pressure to the connector until, under the effect of the vibrations and the pressure, a flow portion of the thermoplastic material is liquefied and caused to flow; and
   removing the source of the vibrations and causing the liquefied thermoplastic material to re-solidify;
   wherein the core element has on a surface at least one locking feature;
   wherein after the step of removing, the connector comprises a foot portion, a head portion, and a shaft portion between the foot portion and the head portion, the shaft portion extending along an axis through the first opening, and thereby securing the connector to the first object;
   wherein the flow portion forms at least a part of the foot portion or the head portion or both, the foot portion and the head portion; and
   wherein after the step of removing, the core element is secured to the thermoplastic material by a positive fit connection caused by the locking feature.

2. The method according to claim 1, wherein the locking feature comprises at least one of an indentation, a protrusion, a corrugation, an open porosity.

3. The method according to claim 1, wherein the locking feature is embedded in the thermoplastic material prior to the step of applying the vibrations and the mechanical pressure.

4. The method according to claim 1, wherein the flow portion of the thermoplastic material comprises a portion that flows relative to the locking feature to embed the locking feature.

5. The method according to claim 1, wherein the locking feature and the thermoplastic material after the step of removing form an axial positive fit.

6. The method according to claim 1, wherein the locking feature comprises a least one circumferential ridge or circumferential indentation.

7. The method according to claim 1, wherein in the step of providing the connector, the core element and the thermoplastic material together form a pre-assembled connector element with the thermoplastic material embedding the locking feature.

8. The method according to claim 1, wherein in the step of providing the connector, the core element and the thermoplastic material are separate elements.

9. The method according to claim 8, wherein in the step of using the source of the mechanical vibrations, the core element is used to couple the mechanical vibrations and the mechanical pressure into the thermoplastic material.

10. The method according to claim 9, wherein a force that causes the mechanical pressure is coupled into the core element as a tensile force.

11. The method according to claim 1, wherein applying the vibrations and the mechanical pressure comprises compressing the connector between two sonotrodes.

12. The method according to claim 1, wherein applying the vibrations and the mechanical pressure comprises compressing the connector between a sonotrode and a non-vibrating counter element.

13. The method according to claim 12, wherein at least one of the sonotrode and of the counter element has a mold feature.

14. The method according to claim 1, comprising further providing a second object with a second opening, the second object being separate from the connector, wherein the step of arranging comprises arranging the first and second objects and the connector relative to one another so that the first and second openings are aligned and that the connector reaches from a proximal side through the first opening distally into the second opening.

15. The method according to claim 14 comprising, wherein after the step of removing, the core element reaches through a shear plane between the first object and the second object.

16. The method according claim 14, comprising, wherein one or more of the following conditions holds:
   the first and second objects are of different materials;
   at least one of the first object and of the second object comprises a fiber reinforced composite material.

17. The method according to claim 1, wherein the core element has a shape deviating from rotationally symmetrical about an axis.

18. The method according to claim 1, wherein the source of mechanical vibrations is coupled to a sonotrode, the sonotrode comprising a distal coupling-out face, wherein in the step of applying the vibrations the coupling-out face is coupled to a proximal end face of the connector, and wherein the method comprises transmitting the vibrations to the distal side through the connector from its proximal end face to a distal end face to form the foot portion by the flow portion.

19. The method according to claim 18, wherein the connector in an initial state comprises the head portion, the head portion forming a distally facing shoulder that forms a stop when the connector is inserted from the proximal side into the first opening.

20. The method according to claim 1, wherein after the step of removing, the core element is sheathed by the thermoplastic material.

21. The method according to claim 1, wherein after the step of removing, the core element is completely surrounded by the thermoplastic material.

22. The method according to claim 1, wherein the step of applying and pressing is carried out until material of the flowing portion coats a circumferential wall of the first opening at least along a full circumference.

23. The method according to claim 1, wherein an outer contour of the connector and a cross section of the first opening do not have circular symmetry.

24. The method according to claim 1, wherein the locking feature comprises an indentation in a lateral outer surface of the core element.

25. A method of bonding a first object and a second object together by a connector, the method comprising the steps of:
   providing the first object with a first opening, the first opening being a through opening;
   providing the second object with a second opening, the second opening being a through opening
   providing a connector comprising a thermoplastic material and a core element of a material that is not liquefiable or liquefiable only at substantially higher temperatures than the thermoplastic material;
   arranging the first object, the second object and the connector relative to one another so that the first and second openings are aligned with each other and the connector reaches from a proximal side through the first opening and the second opening;
   using a source of mechanical vibrations to generate vibrations, and applying the vibrations and mechanical pressure to the connector until, under the effect of the vibrations and the pressure, a flow portion of the thermoplastic material is liquefied and caused to flow; and
   removing the source of the vibrations and causing the liquefied thermoplastic material to re-solidify;
   wherein the core element has on a surface at least one locking feature;
   wherein after the step of removing, the connector comprises a foot portion, a head portion, and a shaft portion between the foot portion and the head portion, the shaft portion extending along an axis through the first and the second opening;
   wherein the flow portion forms at least a part of the foot portion or the head portion or both, the foot portion and the head portion; and
   wherein after the step of removing, the core element is secured to the thermoplastic material by a positive fit connection caused by the locking feature, the locking feature being arranged laterally with respect to the axis.

* * * * *